United States Patent [19]

Maruyama

[11] Patent Number: 5,016,159

[45] Date of Patent: May 14, 1991

[54] STELLATE STORE AND BROADCAST NETWORK WITH COLLISION AVOIDANCE

[75] Inventor: Naotaka Maruyama, Tokyo, Japan

[73] Assignee: Fuji Xerox Co., Ltd., Tokyo, Japan

[21] Appl. No.: 16,121

[22] Filed: Feb. 18, 1987

[30] Foreign Application Priority Data

| Feb. 21, 1986 | [JP] | Japan | 61-35029 |
| Feb. 21, 1986 | [JP] | Japan | 61-35030 |
| Sep. 12, 1986 | [JP] | Japan | 61-213753 |
| Sep. 25, 1986 | [JP] | Japan | 61-226570 |

[51] Int. Cl.⁵ .......................................... G06F 13/00
[52] U.S. Cl. ................................. 364/200; 364/239.0; 364/229.0; 364/238.1; 370/60; 370/94.1
[58] Field of Search ......................... 364/200, 900; 370/60, 94

[56] References Cited

U.S. PATENT DOCUMENTS

| H586 | 2/1989 | Kun | 370/94 |
| 4,234,968 | 11/1980 | Singh | 455/607 |
| 4,332,027 | 5/1982 | Malcolm et al. | 370/94 |
| 4,430,699 | 2/1984 | Segarra et al. | 364/200 |
| 4,491,942 | 1/1985 | Witte et al. | 370/4 |
| 4,531,238 | 7/1985 | Rawson et al. | 455/601 |
| 4,536,874 | 8/1985 | Stoffel et al. | 370/85 |
| 4,543,627 | 9/1985 | Schwab | 364/200 |
| 4,543,630 | 9/1985 | Neches | 364/200 |
| 4,623,886 | 11/1986 | Livingston | 340/825.5 |
| 4,641,307 | 2/1987 | Russell | 370/60 |
| 4,688,214 | 8/1987 | DeWitt et al. | 370/94 |
| 4,703,475 | 10/1987 | Dretzka et al. | 370/60 |
| 4,755,986 | 7/1988 | Hirata | 370/60 |
| 4,764,919 | 8/1988 | Hunter et al. | 370/60 |
| 4,774,707 | 9/1988 | Raychaudhuri | 370/95 |
| 4,780,870 | 10/1988 | McHarg et al. | 370/60 |

FOREIGN PATENT DOCUMENTS 2111337 6/1983 United Kingdom .

Primary Examiner—Thomas Heckler
Assistant Examiner—Maria Napiorrowski
Attorney, Agent, or Firm—Kinney & Lange

[57] ABSTRACT

A stellate store and broadcast network with collision avoidance comprising a plurality of terminal devices, a central station for collectively relaying data packets issuing from the terminal devices and broadcasting them to the relevant terminal devices, and bidirectional communication channels interposed one each between the terminal devices and the central station, which stellate store and broadcast network is characterized by further incorporating therein reception memories disposed one each at the terminal interfaces of the central station, control circuits for monitoring the statuses of the reception memories, and means for broadcasting the data read out of the reception memories to all the reception lines.

12 Claims, 25 Drawing Sheets

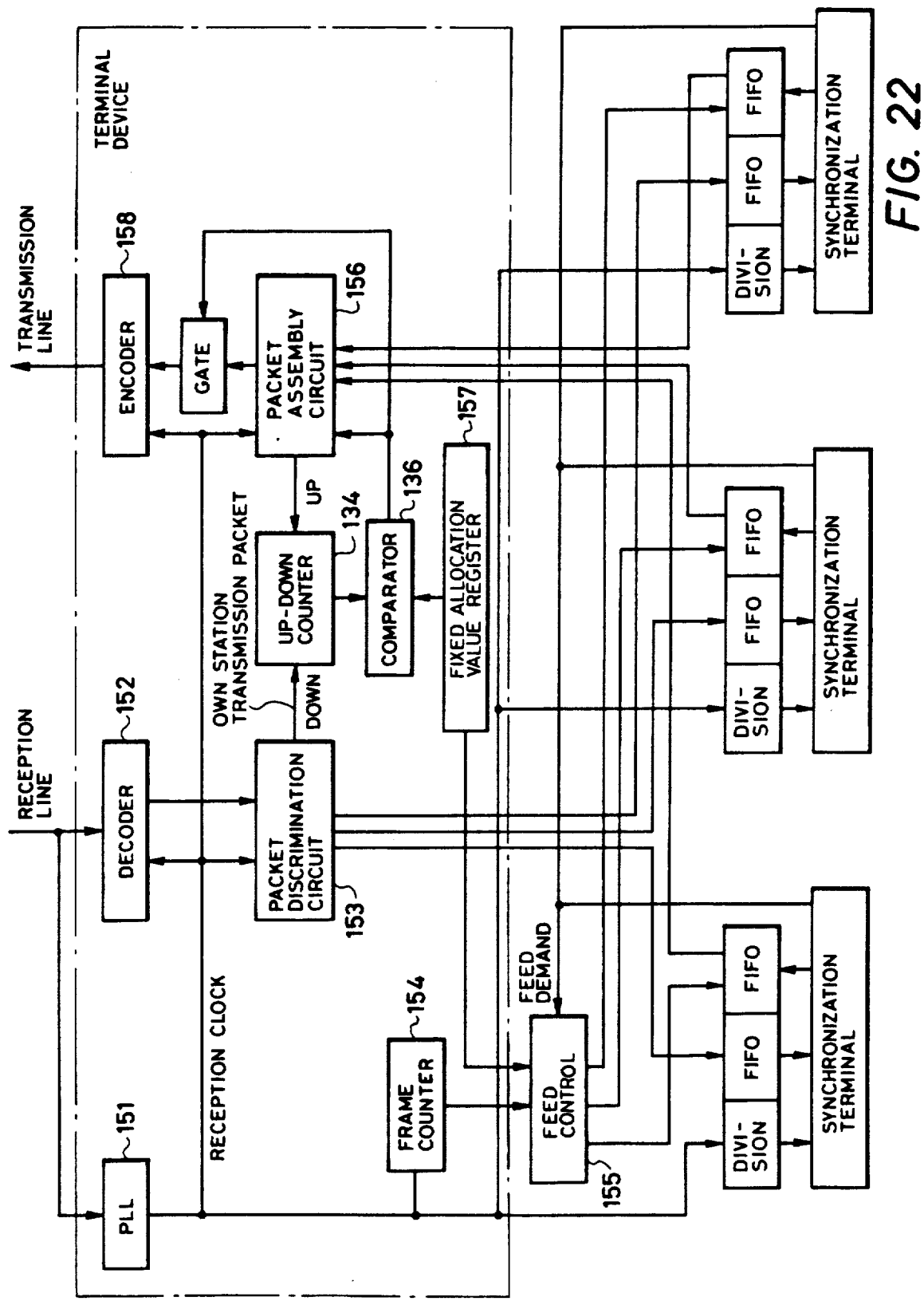

→ NORMAL
--→ VIOLATION

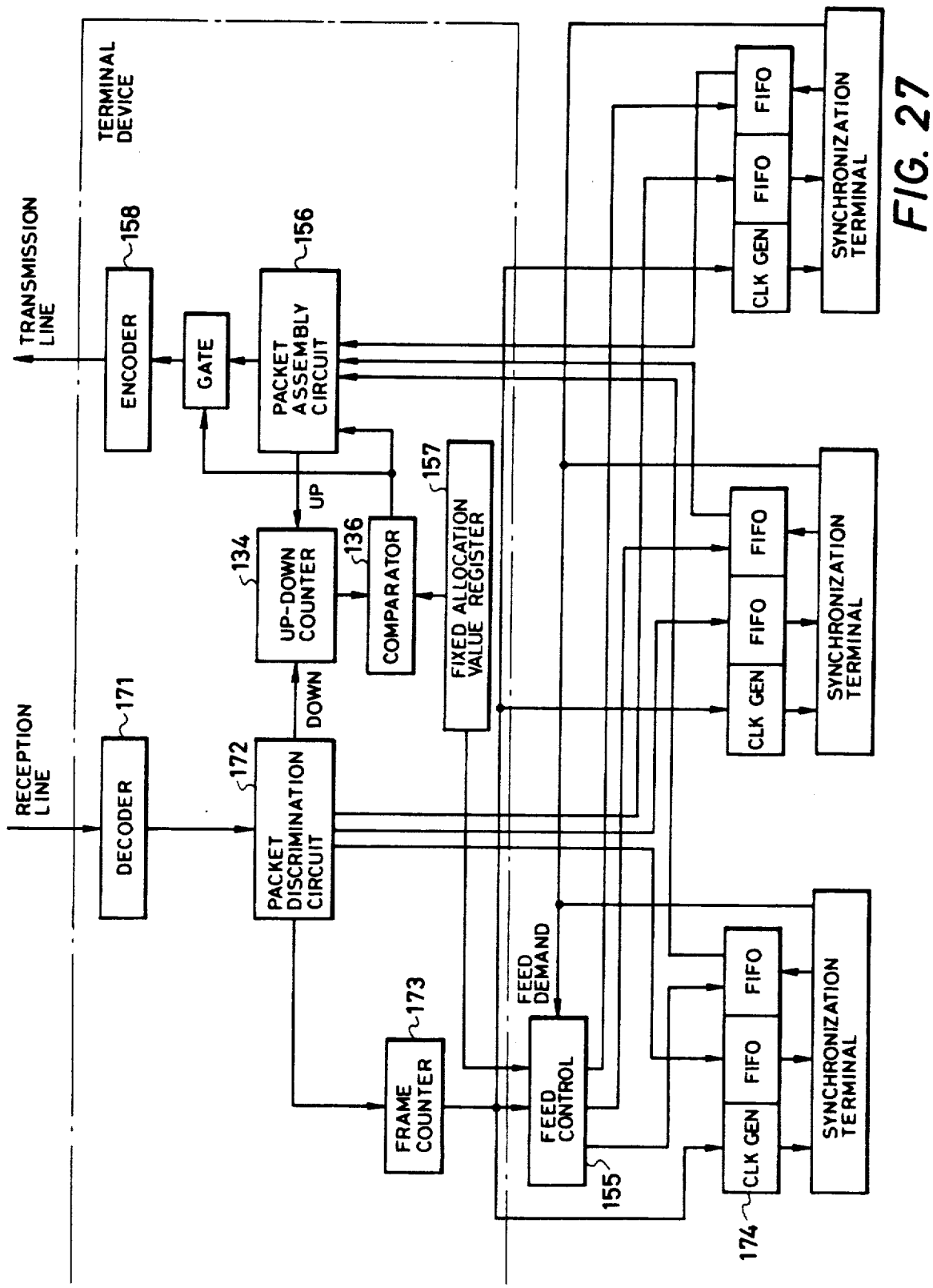

STELLATE STORE AND BROADCAST NETWORK WITH COLLISION AVOIDANCE

FIELD OF THE INVENTION

This invention relates to a stellate network and more particularly relates to a stellate "store and broadcast" network improved so that otherwise possible collision of data on circuits will be eliminated and the circuits forming the network will be utilized efficiently.

DESCRIPTION OF THE PRIOR ART

The conventional stellate network will be described with reference to FIG. 1.

The conventional stellate network, as illustrated in the diagram, has a plurality of station terminal devices A-N connected to a central station 1 by the medium of transmission lines 2a-2n and reception lines 3a-3n.

When a data packet is issued from the terminal device A of A station, this data packet is forwarded through the transmission line 2a of A station to the central station 1. The central station 1, on receiving the data packet from the terminal device A of A station, broadcasts the data packet to all the terminal devices via the reception lines 3a-3n of A-N stations. Each of the terminal devices of the A-N stations checks the arriving data packet to find whether or not it is addressed thereto and, when the answer is in the affirmative, admit the data packet therein.

The terminal devices are adapted so that they always keep watch for signals advancing through the reception lines 3a-3n and keep themselves from transmitting while the reception lines are in the process of transmitting any data packet. A particular one of the terminal devices which has been requested to transmit by a superior hierarchical level starts transmission on completion of the reception of the data packet mentioned above. When, in this case, the request for transmission is issued to two or more stations, since the plurality of stations start transmitting data packets at the same time, there ensues collision of data packets. This collision is detected by the central station 1. The central station 1, on detecting this collision, informs all the terminal devices A-N of this collision.

On being informed of the collision of data packets in the network or on circuits by the central station 1, the particular terminal devices which are transmitting data involved in the collision stop transmission. Then, a processing for retransmission is carried out as by the back-off algorithm.

The operation described above will be explained by reference to the time chart shown in FIG. 2. When the terminal device of A station is requested to transmit by a superior hierarchical level, since neither a data packet nor a collision signal exists on the relevant reception line, the terminal device issues a data packet (A station packet), which is forwarded via the transmission line 2a of A station to the central station 1 and further transmitted to the reception lines 3a-3n. When the terminal devices of B and C stations advance requests for transmission while the A station packet is still being transmitted, these terminal devices simultaneously start transmission after the transmission of the A station packet is completed. Since collision of data occurs at the central station 1 as the result, the central station issues a signal of collision to the reception lines 3a-3n. The terminal devices of B and C stations, therefore, stop transmission and start a processing for retransmission as by the back-off algorithm. The terminal device of D station which produces a request for transmission after the collision acquires the right of transmission and, thereon, issues a data packet (D station data packet).

The conventional technique described above entails the following problems.

(1) Each of the terminal devices, verging on transmission of a data packet, requires to check and find whether or not the other stations are still transmitting and, on occurrence of a collision of data packets, discontinue transmission of a data packet and start a processing for retransmission as by the back-off algorithm. The hardware and software configurations required for the terminal devices, therefore, are inevitably complicated.

(2) While the central station 1 is issuing a signal of collision after occurrence of a collision of data packets, the terminal devices are not allowed to issue data packets onto the network. The probability of collision, therefore, grows with the number of terminal devices seeking access to the network during a fixed length of time. The overall length of time during which signals of collision are issued from the central station is so long that the actual volume of transmission obtained by the whole system is considerably smaller than the actual physical capacity of transmission.

(3) For all the terminal devices to effect detection of a collision of data packets, the smallest packet length must be greater than the round-trip time of the largest system. As the result, the largest system length is limited by the smallest packet length. The architecture of the system, therefore, is deficient in flexibility.

(4) Since the delay time is dispersed by collision, the system is unfit for the real-time transmission such as the conversational voice communication which particularly cherishes the transmission-reception relation on the realtime basis. Moreover, the maximum delay time in transmission is not guaranteed by this system.

SUMMARY OF THE INVENTION

The first object of this invention is to provide a stellate store and broadcast network with collision avoidance which operates effectively with terminal devices of simple software and hardware configurations and which possesses a capacity for transmission substantially equal to the actual physical capacity for transmission.

The second object of this invention is to provide a stellate store and broadcast network with collision avoidance which constitutes itself a system permitting access to data packets issued in response to requests for transmission based on the units of one frame and which, therefore, fits the real-time transmission such as the conversational voice communication which particularly cherishes the transmission-reception relation on the real-time basis.

The third object of this invention is to provide a stellate store and broadcast network with collision avoidance fit for the real-time data transmission such as of voice data and, at the same time, permit establishment of a multiplicity of channels having the maximum delay time guaranteed in transmission by configuring a system guaranteeing the maximum delay time in transmission.

The fourth object of this invention is to provide a stellate store and broadcast network with collision avoidance possessed of the function of synchronous communication fit for the real-time data transmission such a of audio and video data.

The fifth object of this invention is to provide a stellate store and broadcast network with collision avoidance which, in the case of a system comprising terminal devices not required to guarantee the maximum delay time in transmission, enables a multiplicity of terminal devices to be incorporated therein by having the terminal devices connected to local concentrator devices which are connected to the central station.

This invention relates basically to a stellate store and broadcast network with collision avoidance comprising a plurality of terminal devices, a central station for collectively relaying data packets issuing from the terminal devices and broadcasting them to the relevant terminal devices, and bidirectional communication channels interposed one each between the terminal devices and the central station, which stellate store network is characterized by further incorporating therein reception memories disposed one each at the terminal interfaces of the central station and each possessed of a capacity for at least one data packet, control circuits for monitoring the statuses of the reception memories and forwarding read signals sequentially to the reception memories in the process of admitting data, and means for transmitting the data read out of the reception memories to all the reception lines thereby enabling the data packets fed out of the terminal devices to be provisionally stored in the reception memories and allowing the data to be read out of the reception memories and forwarded to the terminal devices for the purpose of avoiding collision of data during the transmission, permitting the volume of transmission to be effectively increased proximately to the maximum capacity for transmission and reception owned by the network, and obviating the necessity of imposing a limit on the maximum system length for avoidance of data collision.

This invention is also characterized by polling the reception memories mentioned above at intervals of a fixed time frame (hereinafter referred to "one frame").

This invention is further characterized by providing a system which guarantees the maximum delay time owing to a configuration capable of always limiting below a fixed level the amount of packets accumulated in such reception memories as permitting access by the aforementioned polling.

Moreover, this invention is characterized by incorporating terminal devices connected to local concentrator devices which are connected to the central station.

BRIEF DESCRIPTION OF THE DRAWINGS

FIG. 22 is a block diagram illustrating a typical synchronous communication terminal device.

FIG. 27 is a block diagram of another typical synchronous communication terminal device.

DETAILED DESCRIPTION OF THE INVENTION

Now, the present invention will be described in detail below with reference to the accompanying drawings.

Figure 3:
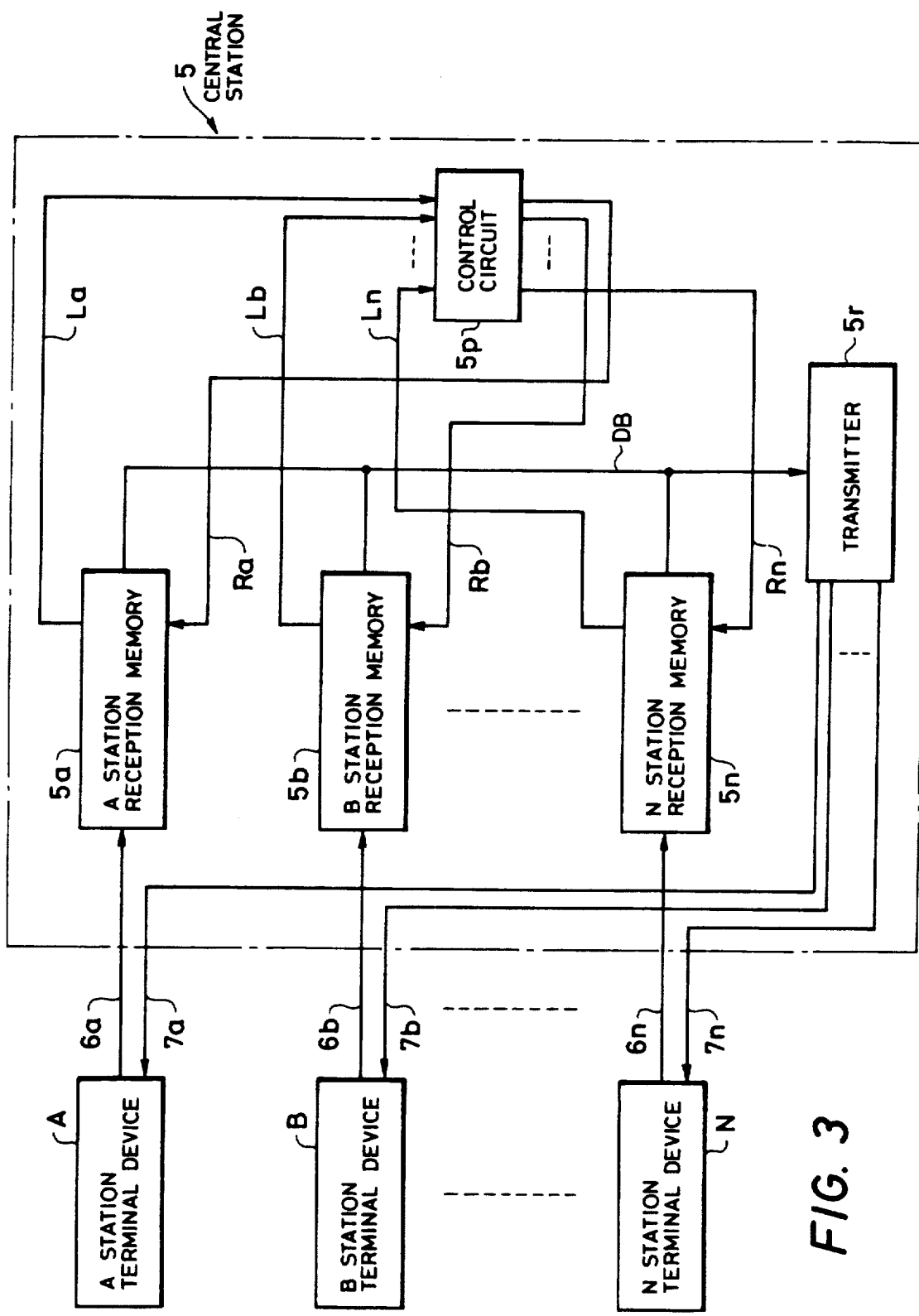
FIG. 3 is a system block diagram of the first embodiment of this invention.

FIG. 3 is a block diagram of the first embodiment of this invention.

As illustrated, the terminal devices of A, B, . . . ,N stations are connected through the medium of transmission lines $6a$, $6b$, . . . , $6n$ and reception lines $7a$, $7b$, . . . , $7n$ to a central station 5. The central station 5 is composed of reception memories $5a$, $5b$, . . . , $5n$ disposed at the terminal interfaces corresponding to the terminal devices of A, B, . . . , N stations, a control circuit $5p$ adapted to monitor the reception memories as to the status of memory and, at the same time, feed out read signals sequentially to the reception memories holding data in storage therein, and a transmitter $5r$ serving to distribute data read out of the reception memories to the transmission lines 7a, 7b, ..., 7n. The reception memories 5a, 5b, ..., 5n are each possessed of a capacity greater than the largest length of one data packet and the first in first out (FIFO) function. The transmission lines and the reception lines used herein may be severally formed of physically independent cables. Otherwise, one cable may be used for jointly forming both transmission and reception channels.

Now, the operation of the present embodiment will be described in detail. When a request for transmission is addressed to any of the terminal devices of A, B, ..., N stations, the terminal device to which the request for transmission is addressed issues a data packet through the transmission line of the own station to the corresponding reception memory. As the result, the data packet is stored in the reception memory.

The reception memories are each possessed of the function of issuing an "ON empty signal" when the memory is empty of data and an "OFF empty signal" when it is filled with data. The particular reception memory in which the data packet has been stored as described above sends out an OFF empty signal to the control circuit 5p via the corresponding one of the empty signal lines La, Lb, ... Ln.

In the meantime, the reception memories to which no data packet has been forwarded from the terminal devices send out ON empty signals to the control circuit 5p via the corresponding ones of the signal lines La, Lb, ..., Ln.

The control circuit 5p keeps constant watch on the statuses of the reception memories by polling the empty signals La, Lb, ..., Ln mentioned above and sends read signals in a prescribed sequence to the reception memories having OFF empty signals. These read signals are forwarded through the control signal lines Ra, Rb, ..., Rn to the reception memories.

The reception memories to which the read signals have been transmitted read out data onto a data bus DB at the same speed as the transmission speed of the network and, after all the data have been read out, forward ON empty signals to the control circuit 5p. The control circuit 5p, thereon, sends read signals out to the next reception memories possessing OFF empty signals.

Figure 1:
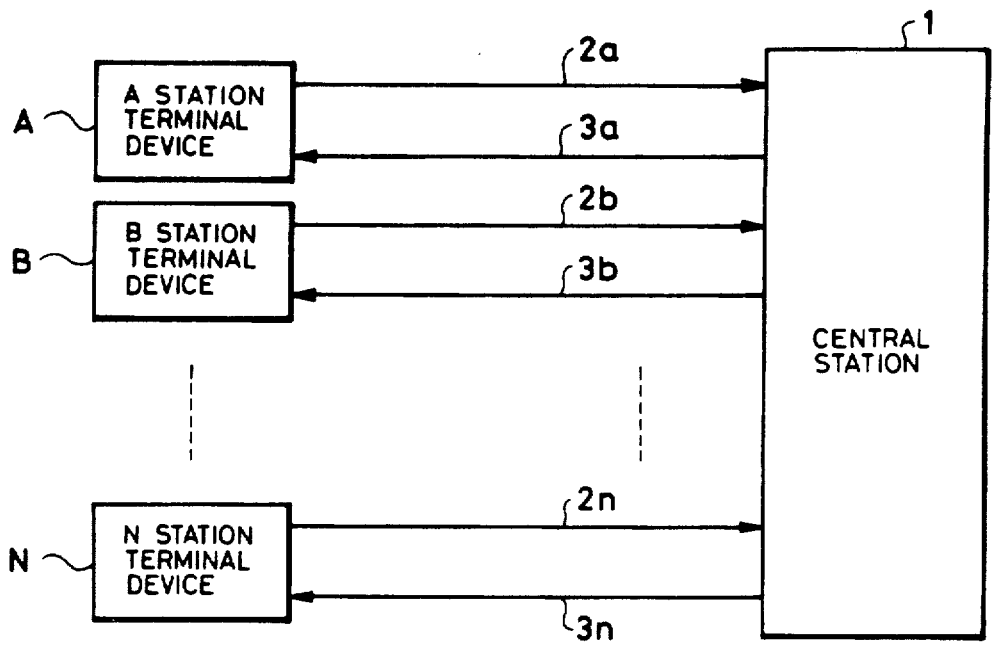
FIG. 1 is a block diagram illustrating the conventional stellate network.
Figure 4:
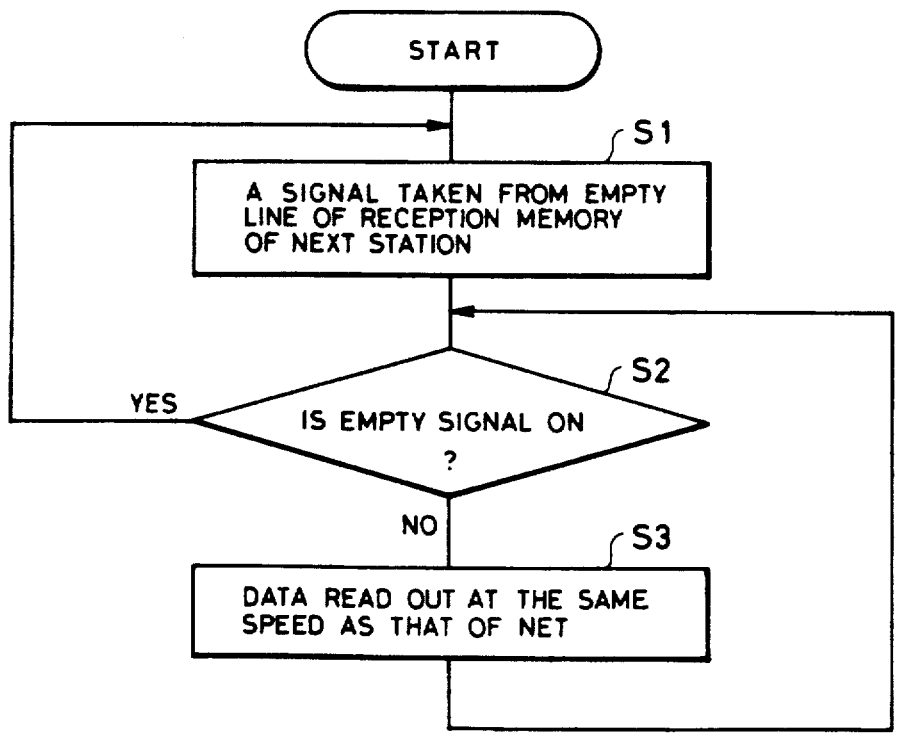
FIG. 4 is a flow chart illustrating the function of the control circuit in the network of FIG. 3.
Figure 2:
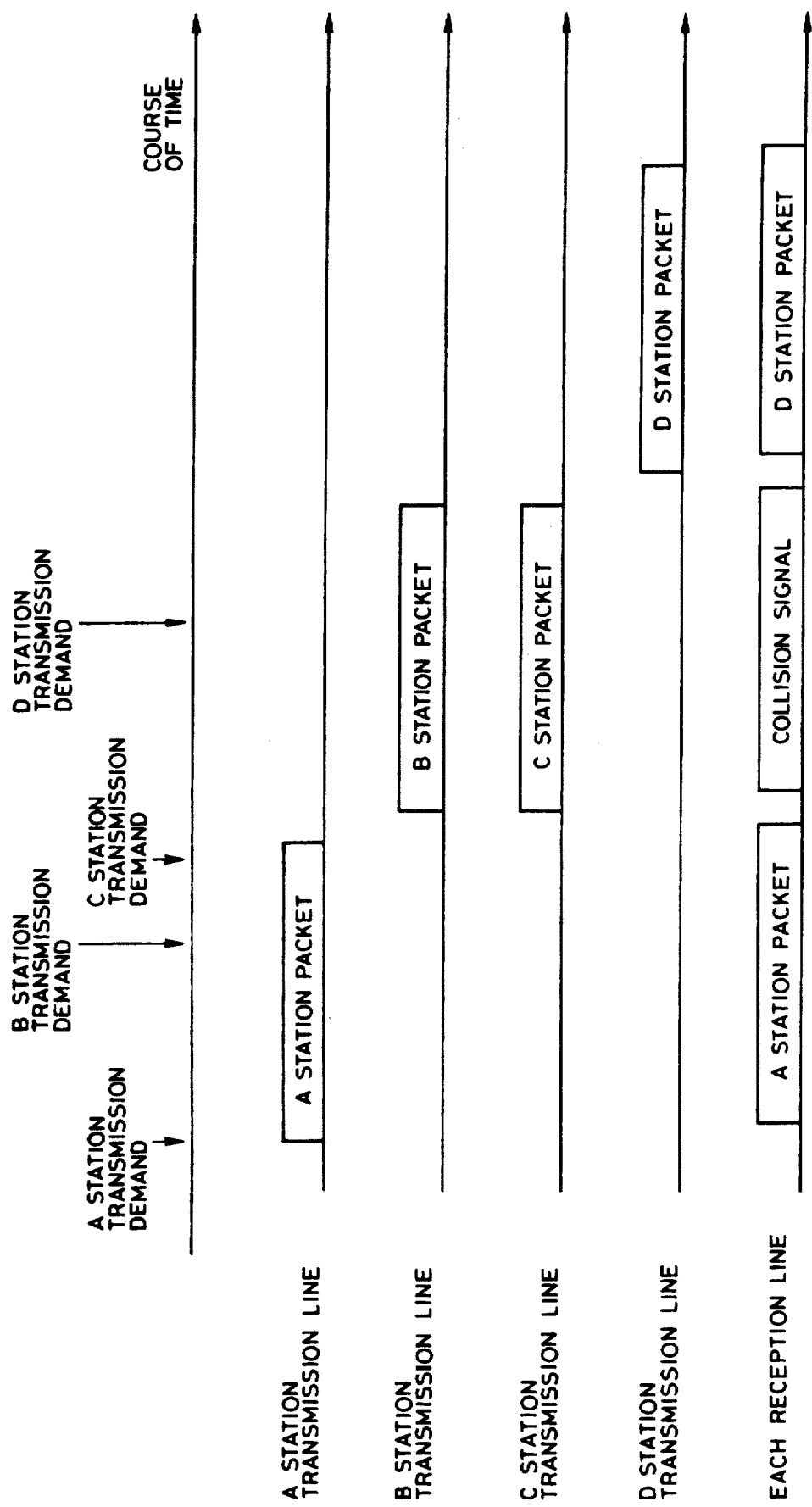
FIG. 2 is a time chart for illustration of the operation of the network of FIG. 1.

The function of this control circuit 5p is shown in FIG. 4. The control circuit 5p goes to the reception memory of a certain station to see the status of empty signal therein (step S1) and find whether this signal is ON or OFF (step S2). When the empty signal is ON, since this reception signal memory is not holding the data packet, the control circuit returns to the step S1 and goes to the reception memory of the next station to see the status of empty signal therein. When the control circuit finds the empty signal OFF in the step S2, it forwards a read signal to the reception memory and reads data therefrom at the same transmission speed as the network (step S3). Throughout the entire course of this readout of data, the control circuit 5p continues to monitor the changing status of the step S2 and checks the reception memory to find out whether or not the readout of data therefrom has been finished. When the answer in the step S2 is in the affirmative, the control circuit draws a conclusion that the readout of data therefrom has been finished and initiates the action of going to the reception memory of the next station to see the status of its empty signal.

Now, the operation mentioned above will be described more specifically. With reference to FIG. 3, it is assumed that data packets are stored in the three reception memories of A, B, and M stations and no data packet is stored in any other reception memory. Then, the control circuit 5p discerns the statuses of the reception memories from the empty signals being forwarded via the empty signal lines and forwards read signals via the control signal line Ra to the reception memory 5a of A station which has a data packet stored therein and, therefore, has an OFF empty signal As the result, the data packet is read out head on from the reception memory 5a and sent to the transmitter 5r at the same speed as the network. The transmitter 5r distributes the data packet to the reception lines of the stations. The terminal devices each examine the received data packet to find whether or not the data packet is addressed thereto and, when the answer is in the affirmative, admit it therein.

When the data of the reception memory 5a of A station has been wholly fed out through the data bus DB, an ON empty signal is forwarded from the reception memory 5a of A station to the control circuit 5p. By this empty signal the control circuit 5p is caused to discontinue the transmission of read signal to the reception memory of A station and transmits read signal to the reception memory 5b of B station which is the next reception memory filled with data.

A station, on confirming that the transmission of data packet from the own station is completed, is readied for admission of a new request for transmission to be issued from the superior hierarchical level. In the meanwhile, since the reception memories of B and M stations are still in the state of holding data packets and are not in the state of issuing a data packet, the terminal devices of B and M stations are not capable of issuing a data packet to the reception memories even when they are given a new request for transmission by the superior hierarchical level. Of course, the terminal devices of other stations than B and M stations are ready to receive a request for transmission issued from the superior hierarchical level.

From the reception memory 5b of B station, the data packet is read out head on onto the data bus B in the same manner as described above. When this readout is completed, the reception memory 5b issues an ON empty signal and the control circuit 5p thereon discontinues the transmission of read signal to the reception memory 5b.

The control circuit takes in the empty signal from the next reception memory. Since this empty signal happens to be of the ON status, the control circuit takes in the empty signal of the subsequent reception memory. After this action is repeated until the empty signal is received from the reception memory of M station, the control circuit issues a read signal to the reception memory of M station because the empty signal from this reception memory is of the OFF status. Thus, readout of data is initiated in the same manner as described above.

When the readout of data from the reception memory 5m of M station is completed, the control circuit 5p checks by polling to find whether or not the empty signal has been fed in from the next reception memory. When this empty signal is of the OFF status, the control circuit transmits a read signal to this particular reception memory to start readout of data. The control circuit repeats this action until the reception memory of N station and then starts the same action again on the reception memory of A station.

Since the condition for the terminal devices of A-N stations to admit a request for transmission from the superior hierarchical level is as described above, it naturally follows that when an empty reception memory is given a request for transmission by the superior hierarchical level, it receives delivery of a data packet from the corresponding terminal device at all times.

Figure 5:
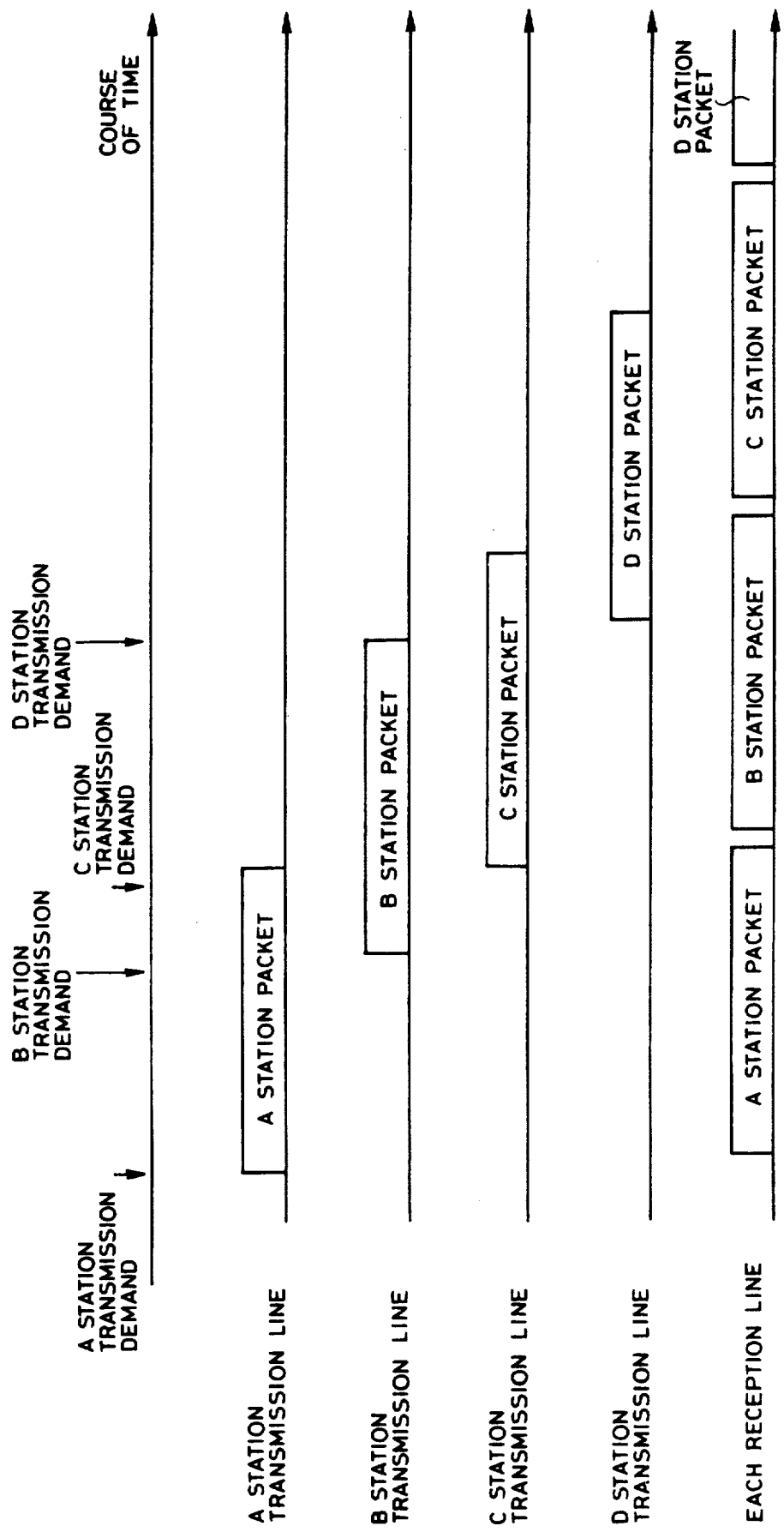
FIG. 5 is a time chart for illustrating the operation of the first embodiment mentioned above.

The stellate network of the present embodiment operates as described above. When requests for transmission is given to A station, B station, C station, and D station within a short span of time as illustrated in the time chart of FIG. 5, for example, the corresponding terminal devices are capable of forwarding data packets via the transmission lines 6a, 6b, 6c, and 6d so long as the reception memories 5a, 5b, 5c, and 5d corresponding thereto are empty. Owing to the configuration described above, the data packets issued from the terminal devices are provisionally held in control circuit 5p, forwarded via the transmitter 5r to the reception lines 7a-7n of the stations without inducing collision of data packets.

The first embodiment of this invention precludes occurrence of collision of data packets on the network and, therefore, attains various effects as described below.

(1) Since the otherwise inevitable flow through circuits of invalid data resulting from collision of data packets is eliminated, the circuits forming the network can be efficiently utilized proximately to the physical capacity of the network.

(2) The central station is relieved of the otherwise essential function of detecting collision of data packets and issuing signals of collision. Consequently, the terminal devices are no longer required to carry out the process for discontinuing the issuance of data packets at the time of collision or the process for restarting transmission as by the backoff algorithm. The central station and the terminal devices, therefore, enjoy simplicity from the standpoint of both hardware and software configuration.

(3) Since the largest system length is no longer required to be set for the purpose of detection of collision of data packets, it now depends on the capacities of drivers and receivers at the opposite ends of the transmission and reception lines. Optionally, the system length may be extended far beyond the capacities of drivers and receivers by the use of a through repeater, for example. The stellate network of the present invention, therefore, permits configuration of a large system. Evidently, use of a gateway permits the network of this invention to communicate with the terminal devices of the other system.

Now, the second embodiment of this invention will be described below. The second embodiment concerns a modified version of the stellate store and broadcast network with collision avoidance, of the first embodiment described above, so modified as to fit the real-time transmission such as the conversational voice transmission which cherishes the transmission-reception relation on the real-time basis.

Figure 6:
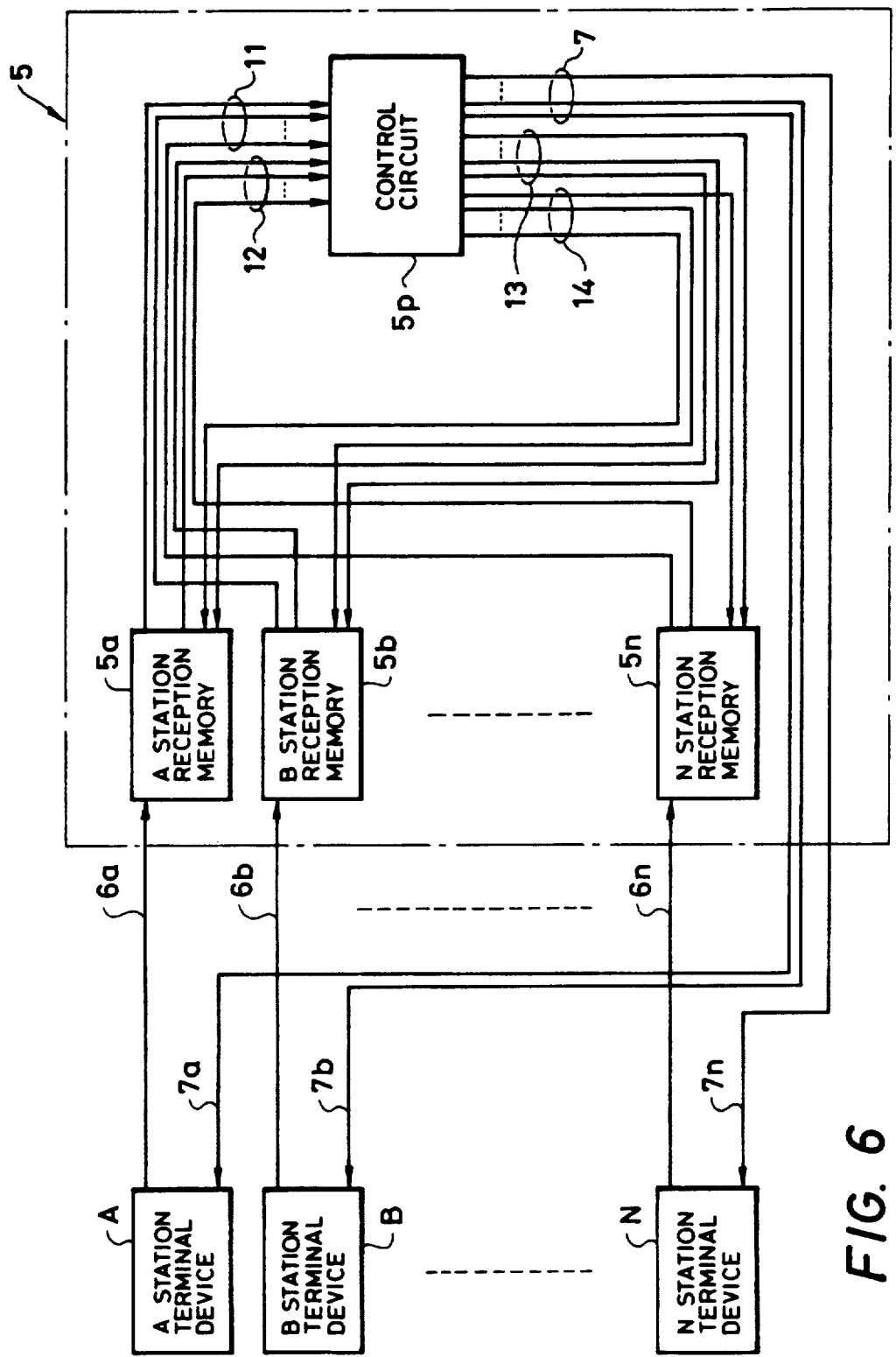
FIG. 6 is a system block diagram of the second embodiment of this invention.
Figure 7:
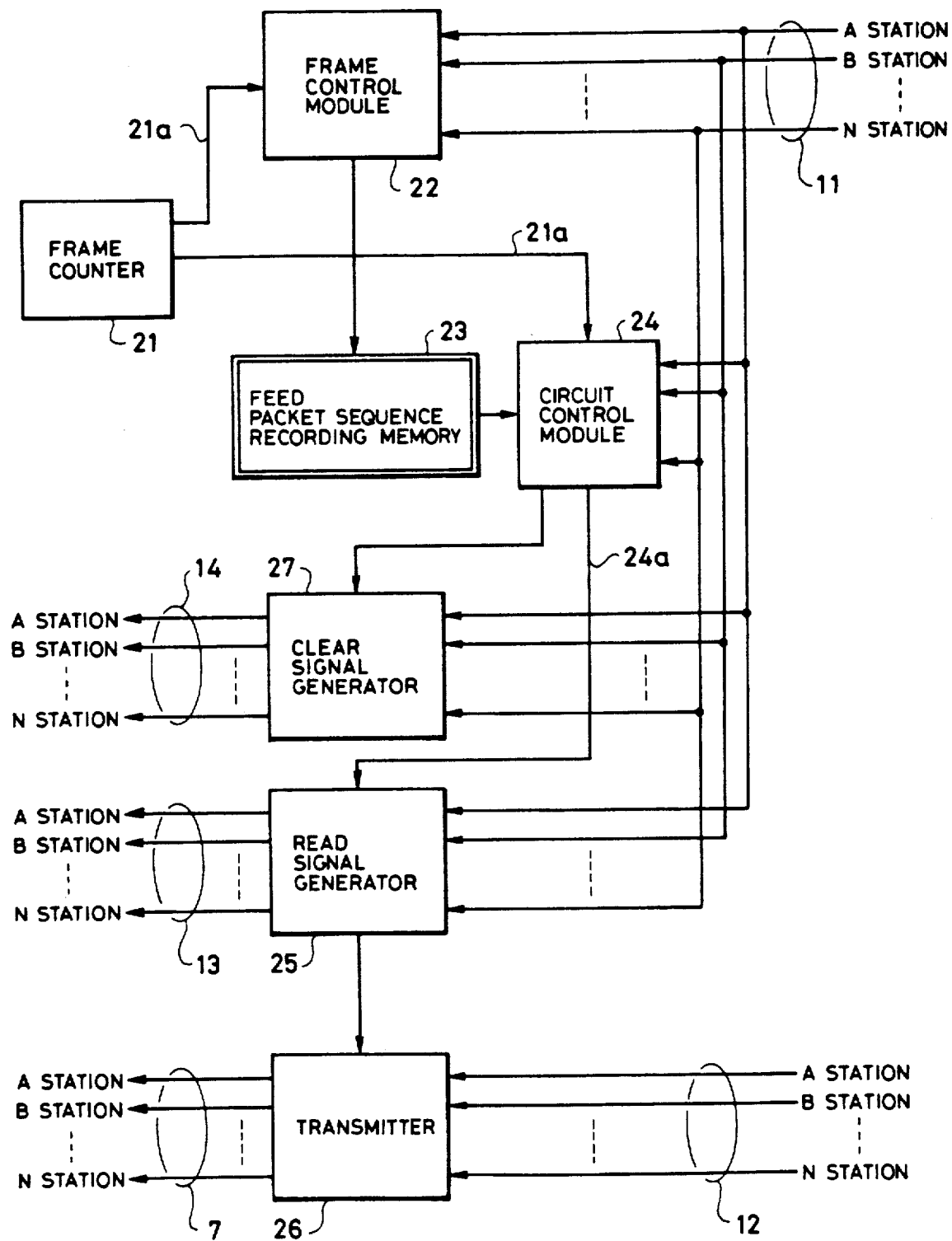
FIG. 7 is a block diagram illustrating atypical control circuit in the system of FIG. 6.

FIG. 6 is a schematic block diagram of the second embodiment of this invention and FIG. 7 is a block diagram illustrating a typical control circuit in the network of FIG. 6.

As shown in FIG. 6, terminal devices of A, B, ..., N stations are connected to a central station 5 through the medium of transmission lines 6a, 6b, ..., 6n and reception lines 7a, 7b, ..., 7n (or 7). The central station 5 is composed of reception memories 5a, 5b, ..., 5n disposed at the terminal interfaces corresponding to the terminal devices of A, B, ..., N stations and a control circuit 5p.

The reception memories 5a, 5b, ..., 5n are each possessed of a capacity for at least one data packet and a function of issuing an ON empty signal onto an empty line 11 when the memory is empty of data or an OFF empty signal thereon when the memory is filled with data. Each of the reception memories, on receiving a read signal forwarded from the control circuit 5p through a memory read line 13, reads data head on from the stored data packet and releases them onto the data line 12 at the same speed as the speed of the network and, on completion of this readout, turns the empty signal ON and issues it onto the empty line 11. It further possesses a function of clearing the memory on receiving a clear signal issued by the control circuit 5p and forwarded through a memory clear line 14.

The control circuit 5p monitors the reception memories 5a, 5b, ..., 5n with respect to their statuses by polling the empty signals of the reception memories once during a fixed frame time T. When some of the reception memories are found to be issuing OFF empty signals, i.e. keeping data packets in storage during the course of one polling the control circuit 5p reads data out of the reception memories once within one frame. Then, it realizes exchange of circuit by releasing the data packets forwarded via the data line 12 onto the reception line 7.

Now, the construction and operation of the control circuit 5p will be described in detail below with reference to FIG. 7.

Figure 8:
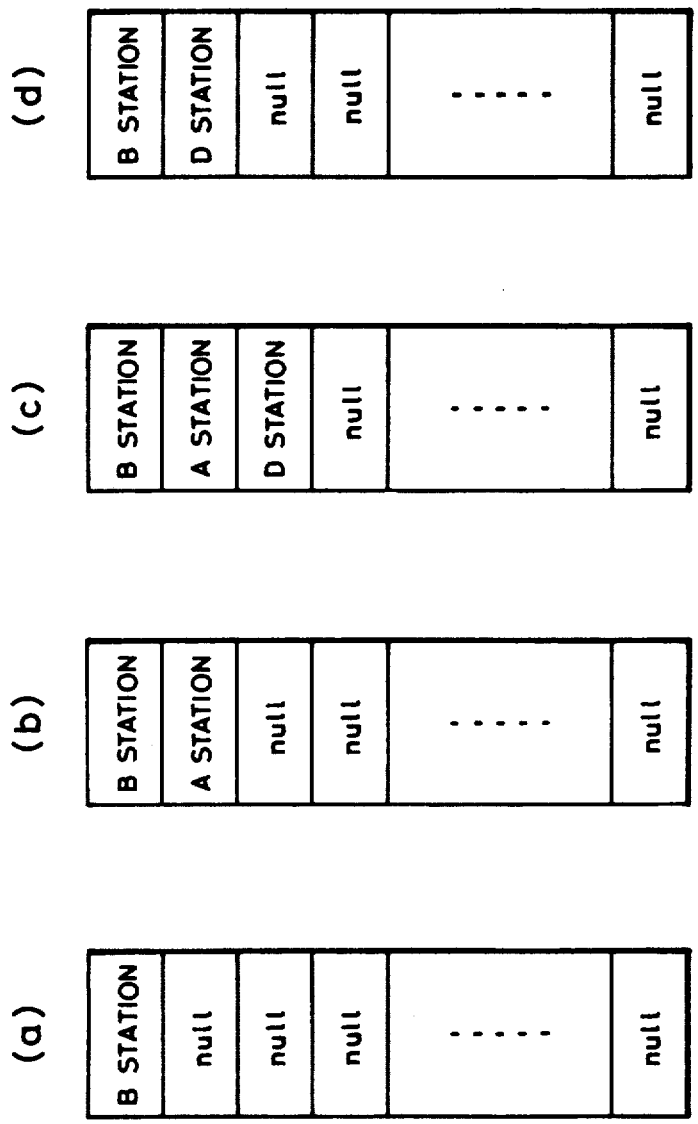
FIG. 8 is an artist's concept of station discriminating data within transmitting packet sequence recording memories in the system of FIG. 6.

A frame counter 21 issues a frame timing signal 21a once within a predetermined time interval (frame time) T. A frame control module 22 is actuated by the frame timing signal 21a. Owing to this actuation, the frame control module 22 discriminates between the statuses, ON and OFF, of the empty signal forwarded from the empty line 11 by polling and then registers the discrimination data on the stations of OFF status in a feed packet sequence recording memory 23. Since the feed packet sequence recording memory 23 is in possession of discrimination data on stations registered up to the preceding frame, the stations which have acquired empty signals in the OFF status in the existing frame are registered in the memory 23 subsequently to the stations registered up to the preceding frame mentioned above.

Where only B station effected transmission in the preceding frame, for example, the discrimination data stored in the feed packet sequence recording memory 23 are limited to those of only B station and the other memory areas are in the status of null as shown in FIG. 8 (a). Then, when the empty signal issued from the reception memory 5a of A station is turned OFF in the present frame, the frame control module 22 detects this condition and causes the discrimination data on A station to be registered in the feed packet sequence recording memory 23. As the result the data in the feed packet sequence recording memory 23 become so that the discrimination data on A station are entered subsequently to those on B station as shown in FIG. 8 (b).

In the meantime, when A station completes transmission within the existent frame while B, A, and D stations are cyclically transmitting with one frame time as the unit cycle as illustrated in FIG. 8 (c), the registration on A station in the feed packet sequence recording memory 23 is erased and the discrimination data stored in the feed packet sequence recording memory 23 are changed as shown in FIG. 8 (d). To be specific, the registration on A station is erased and the register registration on D station which has laid below that on A station is shifted to the position one step higher.

The description will be continued below with reference again to FIG. 7. A circuit control module 24, on entry therein of the frame timing signal 21a, refers sequentially to the contents of the feed packet sequence recording memory 23 from the leading to the trailing end and issues a read start signal 24a to the first of the stations registered therein. As the read start signal 24a is advanced, a read signal generator 25 gives rise to a memory read signal and forwards it via a memory read line 13 to the first station mentioned above. When the reception memory of the first station mentioned above receives the memory read signal mentioned above, the data of the reception memory are read out. The data thus read out are forwarded through the data line 12 and injected into the transmitter 26. The transmitter 26 broadcasts the data to the reception lines 7 as synchronized with the output clock signal forwarded from the read signal generator 25.

When the issue of data from the reception memory of the first station is completed and the empty signal fed out by the reception memory via the empty line 11 is consequently turned ON, the read signal generator 25 detects this condition and discontinues the issue of a memory read signal to the first station. When the circuit control module 24 detects the change of the empty signal to the ON status, it reads out the second station registered in the second area of the feed packet sequence recording memory 23 and feeds the read start signal 24a to the second station mentioned above. As the result, the read signal generator 25 gives rise to a memory read signal and forwards it to the second station in the same manner as described above. The data of the reception memory of the second station are read out and the data thus read out are injected via the data line 12 into the transmitter 26. Subsequently, the data are forwarded through the transmission lines 7 to the terminal devices of A-N stations as synchronized with the output clock signal fed out by the transmitter 26 through the read signal generator 25.

By the same token, the data in the reception memories corresponding to the stations registered in the feed packet sequence recording memory 23 are sequentially read out and forwarded to the corresponding terminal devices.

As regards the data which cannot be fed out within one frame, the reception memories of the stations which have these data stored therein are forcibly cleared by the fact that the circuit control module 24 causes the readstart signal generated by the read signal generator 25 and the memory clear signal generated by the clear signal generator 27 to be forwarded respectively via the memory read line 13 and the memory clear line 14 to the reception memories mentioned above.

When one frame time is passed in forwarding the data packets which are fed out of the terminal devices within one frame time as described above, the frame counter 21 issues the frame timing signal 21a again. Then, the station which has been freshly requested to transmit is newly added to the feed packet sequence recording memory 23 and the station which has just completed transmission is erased from the memory 23. By the renewed discrimination data in the feed packet sequence recording memory 23, the same operation as described above is repeated.

The control circuit 5p operates as described above. From the foregoing description, it will be seen that in the present embodiment, the data packets stored in the reception memories 5a-5n are fed out one each per frame in the order in which they are registered in the feed packet sequence recording memory 23.

Now, the function of the terminal devices of A-N stations will be described below. The terminal devices, after their respective stations have fed out data packets of their own to the corresponding reception memories 5a-5n, assume a state prohibiting issuance of a data packet and continue to remain in this state until they confirm that the data packets of their own issuance have been forwarded thereto from the central station 5. Even when requests for transmission of data packets are given them by a superior hierarchical level while the state of prohibition is continuing, the terminal devices are not enabled to issue a data packet to the reception memories. It is not until the terminal devices confirm arrival of the data packets of their own issuance forwarded from the central station 5 that they are relieved of the state of prohibiting issuance of a data packet and are enabled to issue the subsequent data packet requested by the superior hierarchical level.

When the terminal devices do not receive the data packets of their own issuance from the central station even after elapse of one frame time or more, since the circuits are occupied to capacity in this condition, the terminal devices confirm that the issued data packets are cleared by the central station and then again forward the data packets to the reception memories. To realize this operation, the terminal devices are required each to own a timer for clocking two frame times and to possess a function of recognizing that the data packets of their own issuance have been cleared and reissuing data packets when they fail to receive the data packets of their own issuance within two frame times after issuance of the data packets of their own issuance.

Figure 9:
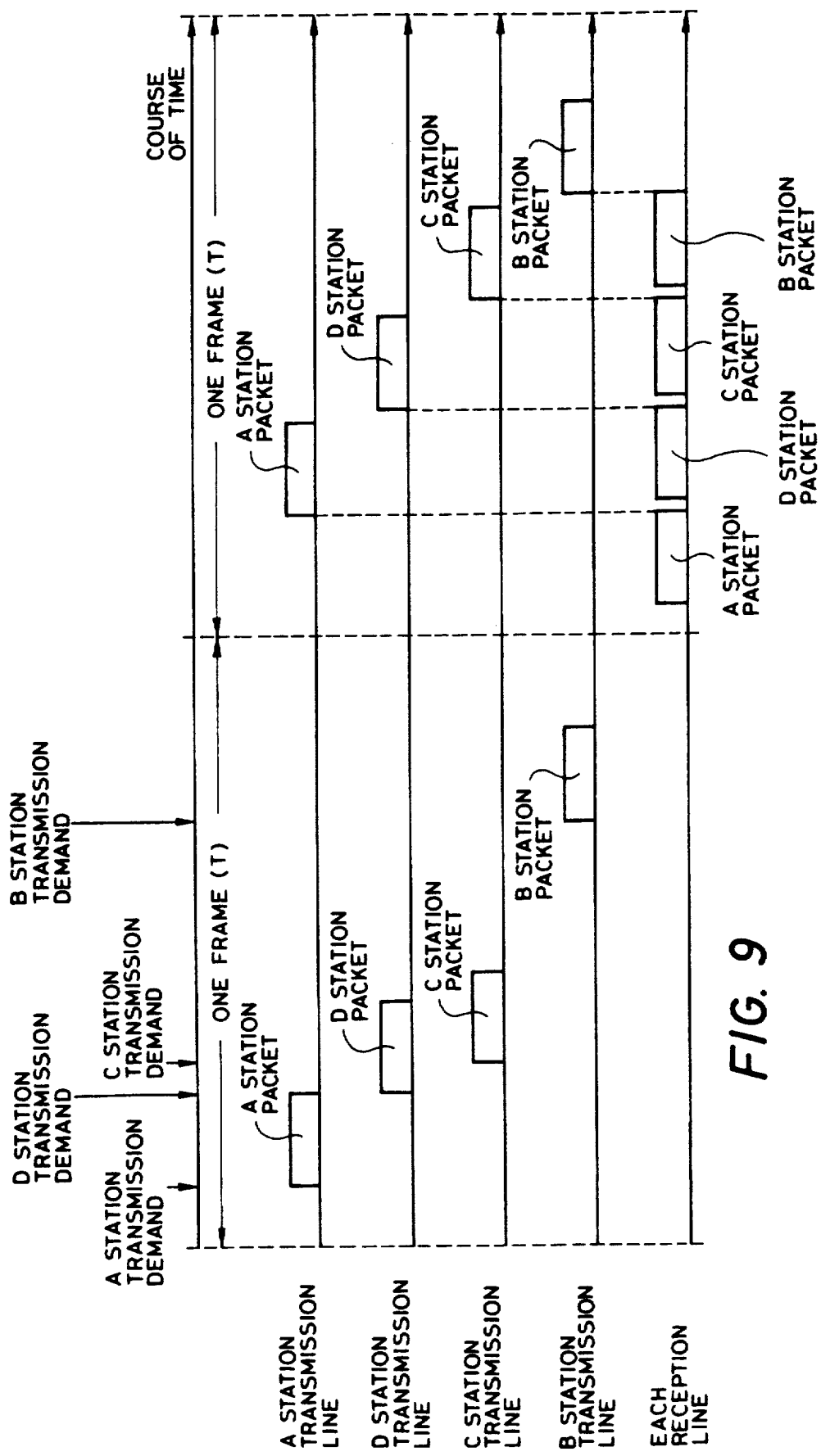
FIG. 9 and FIG. 10 are time charts of data packets which occur when the embodiment is utilized respectively as circuit exchange network and packet exchange network.

A typical manner in which data packets are issued from the terminal devices onto the circuits by the operation described above is shown by the time chart of FIG. 9.

It is assumed that the terminal devices of A, D, C, and B stations are requested to transmit data in the order mentioned during the course of a certain frame (T) time. Then, the data packets from A, D, C, and B stations are forwarded through their respective transmission lines and received for storage in the respective reception memories and, at the same time, registered in the order mentioned in the feed packet sequence recording memory 23 mentioned above. During the subsequent one frame time, the station discrimination data in the feed packet sequence recording memory 23 are read out in the order of their registration and the corresponding data packets are read out of the reception memories and fed out onto the circuits. To the reception lines, therefore, the data packets of A, D, C, and B stations are transmitted in this order as illustrated in the diagram. In other words, from the terminal devices, these data packets are transmitted in the order of requests for transmission issued and, in each frame, they are transmitted in this order unless the transmission is completed.

The present embodiment has been described as utilized in the form of a circuit exchange network. This invention is not limited to this particular utility. It may be utilized as a packet exchange network or a hybrid exchange network. Incidentally, the circuit exchange network is a system designed so that a fixed amount of packets are issued without fail once per fixed time slot and the packet exchange network is a system such that data of variable packet lengths are issued although it possesses no exclusive circuit.

The present embodiment can be utilized as a packet exchange network for the following reason. It is assumed that A, B, C, and D stations indicated in the diagram of FIG. 6 are requested to transmit data packets. Then, the terminal devices of A-D stations forward the data packets via the transmission lines 6a–6d to the reception memories 5a–5d of A-D stations. At this time, the terminal dc vices of A-D stations assume the state prohibiting transmission of data.

The frame control module 22 of the central station 5, at the beginning of the next frame, effects the polling of the empty signals forwarded from the reception memories 5a-5n and causes A-D stations possessing OFF empty signals to be registered in the feed packet sequence recording memory 23. In the meantime, the circuit control module 24, on entry therein of a frame timing signal 21a, obtains random access to the feed packet sequence recording memory 23, feeds a read start signal in the same manner as described above to the reception memories of the registered stations, and reads out the data. In this way, the stellate store and broadcast network of the present invention can be utilized as a packet exchange network.

The present embodiment, as described above, can be utilized as a packet exchange network for effecting transmission of data without entailing collision of data even when requests for transmission are made simultaneously by many stations.

When requests for transmission are simultaneously made by many stations and part of the data consequently emanating from the reception memories cannot be transmitted within one frame time, the excess data are cleared by the memory clear signal produced by the clear signal generator 27 in much the same way as when the present embodiment is utilized as the circuit exchange network mentioned above.

Figure 10:
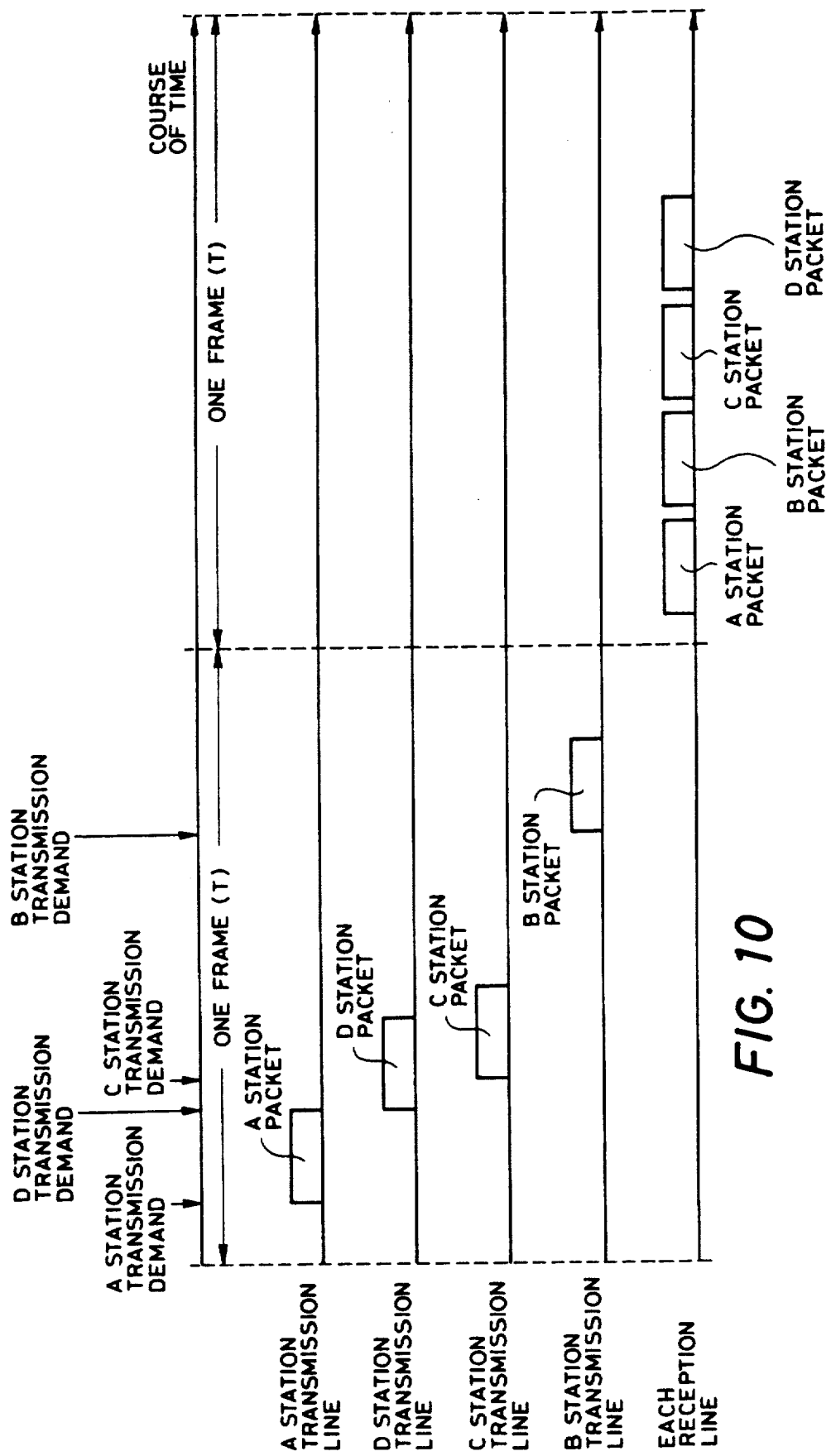

A typical manner in which data packets are fed out by the terminal devices onto the circuits in consequence of the operation described above is shown in the time chart of FIG. 10.

It is assumed that requests for transmission of data are given to the terminal devices of A, D, C, and B stations in the order mentioned within one given frame time (T). Then, the data packets from A, D, C, and B stations are forwarded through the respective transmission lines and received for storage by the respective reception memories, then subjected to polling by the subsequent frame timing pulse, and registered in the feed packet sequence recording memory 23. During the next one frame time, the station discriminating data are read out of the feed packet sequence recording memory 23 and the corresponding data packets are read out of the respective reception memories and fed out onto the circuits. As a result, to the transmission lines, the data packets of A, B, C, and D stations are forwarded in the order mentioned unlike the order of the aforementioned requests for transmission as illustrated in the diagram.

The present embodiment permits transmission of data in the form of packet exchange in entirely the same procedure as in the form of circuit exchange as described above. When these two forms of exchange are combined, there is established a hybrid exchange system.

The second embodiment of this invention brings about the following effect in addition to the effects of (1)–(3) possessed by the first embodiment indicated previously.

(4) When the network of the present embodiment is utilized as a circuit exchange network, it is highly suitable for real-time transmission such as the conversational voice communication which cherishes the transmission-reception relation on the real-time basis Now, the third embodiment of this invention will be described below with reference to the accompanying drawings This embodiment resides in configuration of the stellate store and broadcast network such as to guarantee the maximum delay time in transmission and, therefore, suit real-time transmission of data such as voice data. Further, the network is so configured that one terminal station is enabled to establish a multiplicity of channels each endowed with the maximum delay time in transmission.

Figure 11:
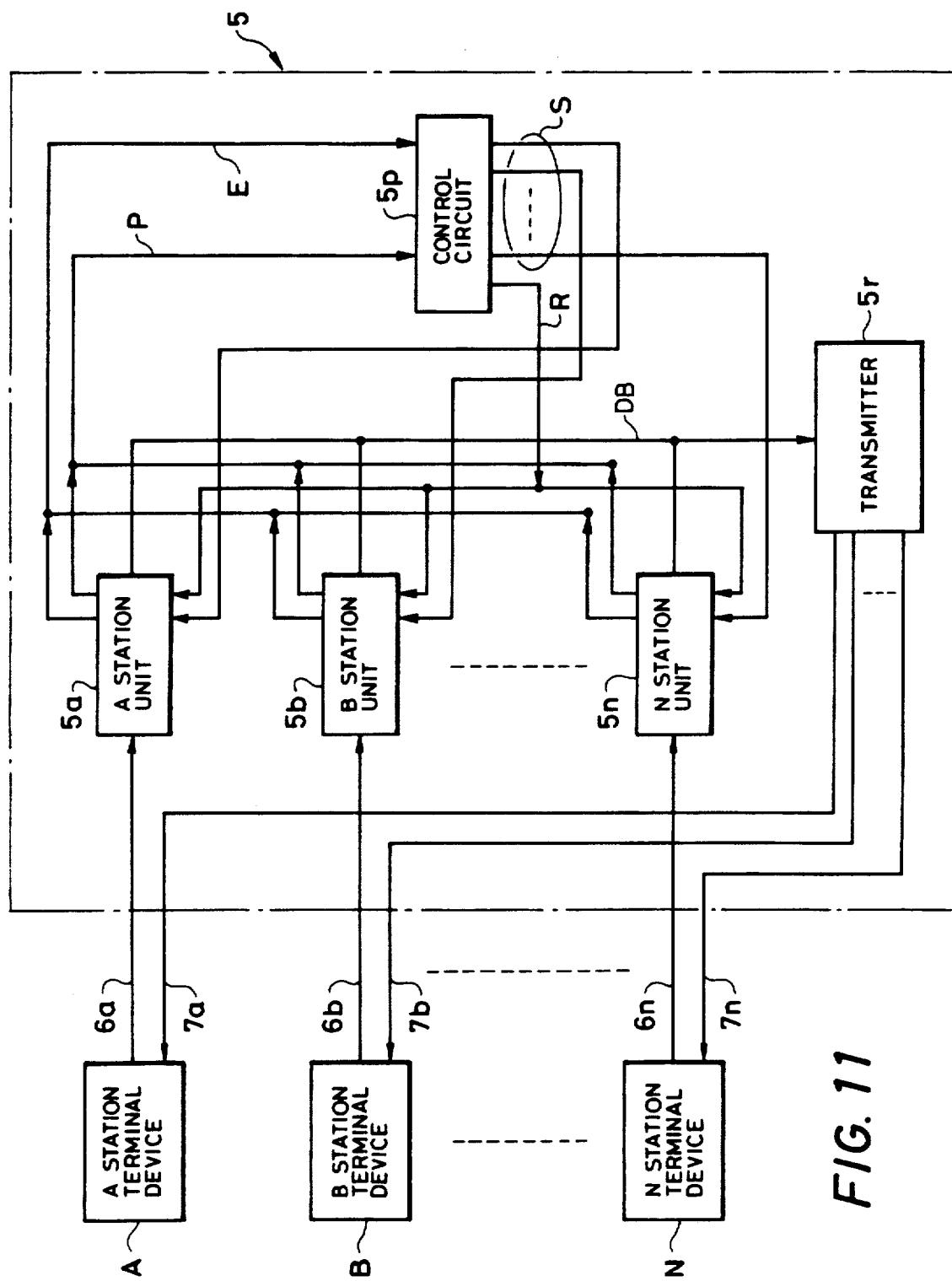
FIG. 11 is a system block diagram of the third embodiment of this invention.

FIG. 11 is a schematic block diagram of the third embodiment of this invention.

As illustrated in the diagram, terminal devices of A, B, . . . , N stations are connected respectively via transmission lines 6a, 6b, . . . , 6n and reception lines 7a, 7b, . . . , 7n to a central station 5. The central station 5 is provided with A, B, . . . , N station units 5a, 5b, . . . , 5n disposed at the terminal interfaces correspondingly to the terminal devices of A, B, . . . , N stations, a control circuit 5p adapted to monitor these stations units and, at the same time, issue read signals sequentially to the station units holding data therein, and a transmitter 5r serving to distribute the data read out of the station units to the reception lines 7a, 7b, . . . , 7n. The A, B, . . , N station units 5a, 5b, . . . , 5n are each possessed of a reception memory formed such as of FIFO. The amount of data which can be accumulated simultaneously in the reception memory is limited to a prescribed level. The transmission lines and the reception lines involved in the configuration under discussion may be severally formed of physically independent cables. Alternatively, one cable may be utilized for both transmission and reception channels jointly.

The control circuit 5p and the A, B, . . . , N station units 5a, 5b, . . . , 5n are interconnected through the medium of a select line S serving to forward a select signal for the selection of the station units, a read line R serving to forward a read signal, an empty signal line E serving to forward an empty signal, and a packet interval detection signal transmission line P serving to forward a packet interval detection signal. The data read out of the A, B, . . . , N station units 5a, 5b, . . . , 5n are forwarded via the data line DB to the transmitter 5r.

Now, a typical arrangement of the A, B, . . . , N station units 5a, 5b, . . . , 5n will be described below with reference to FIG. 12. Since the units 5a, 5b, . . . , 5n are composed identically, the composition of the A station unit 5a will be described in detail as a representative.

Figure 12:
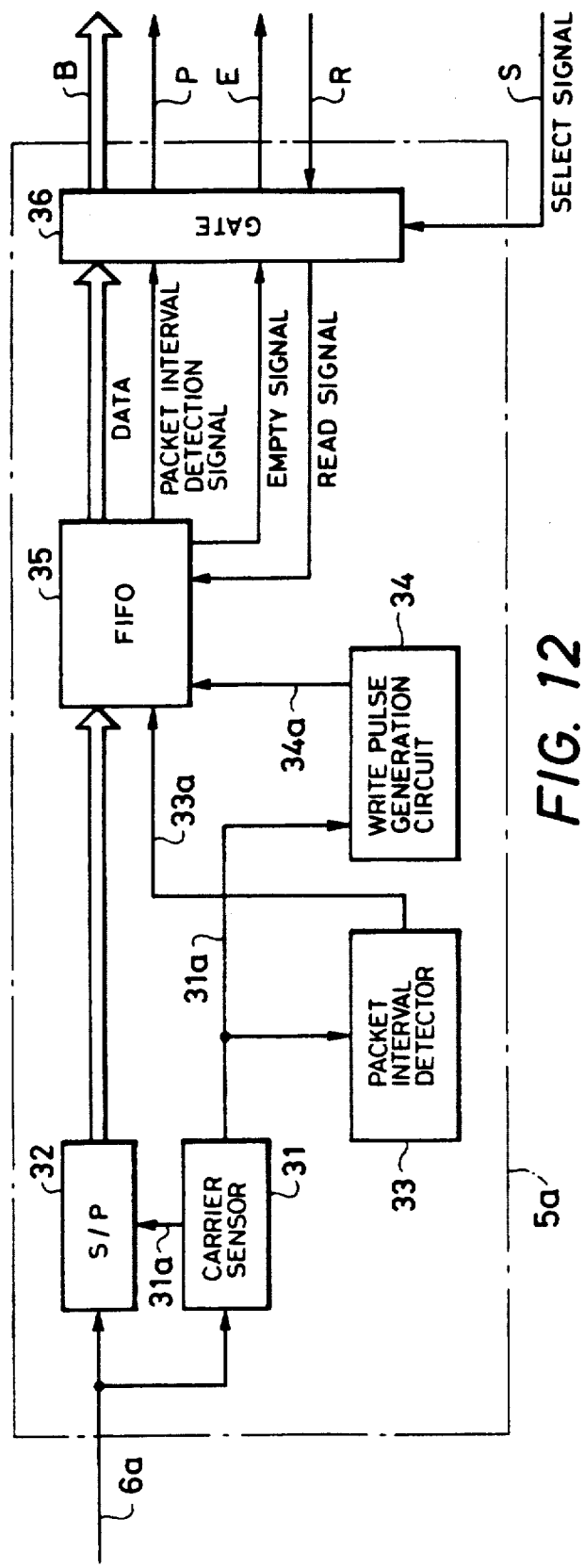
FIG. 12 is a block diagram of a typical A station unit in the system of FIG. 11.

As illustrated in FIG. 12, the A station unit 5a is composed of a carrier sensor (CS) 31, a serial/parallel (S/P) conversion circuit 32, a packet interval detector 33, a write pulse generating circuit 34, a first in first out (FIFO) memory 35, and a gate 36.

Now, the function of each of the component elements mentioned above will be described below with reference to the time chart of FIG. 13. The reference numerals used in FIG. 13 correspond to those of FIG. 12.

Figure 13:
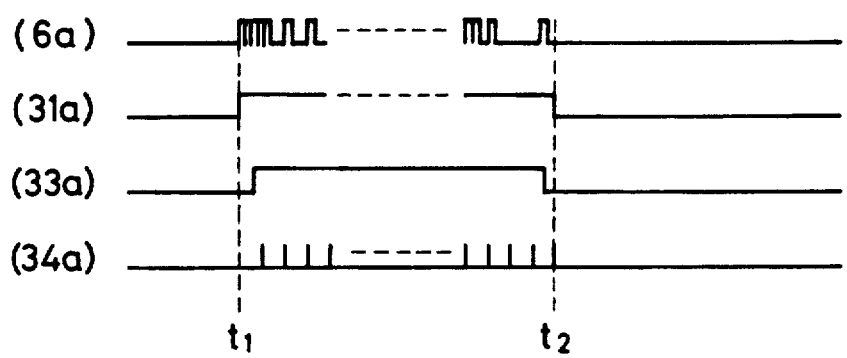
FIG. 13 is a time chart of signals in the principal part of the A station unit of FIG. 12.

The carrier sensor 31 always keeps watch on the transmission line 6a and, on detecting a signal 6a which is forwarded from the terminal device A of A station as illustrated in FIG. 13, feeds a carrier detection signal 31a to the serial/parallel conversion circuit 32, the packet interval detector 33, and the write pulse generation circuit 34. The serial/parallel conversion circuit 32, on receiving the carrier detection signal 31a from the carrier sensor 31, is actuated to convert the serial data brought in via the transmission line 6a into parallel data and forward the parallel data to the FIFO 35.

In the communication system such as Ethernet, no carrier exists where no signal is present on the path of transmission. But there are systems of communication in which transmission of a carrier occurs even in the absence of a signal on the path of transmission. In the optical communication, for example, a signal if some form or other is always fed out onto the path of transmission for the purpose of stabilizing the value of a feed back loop of the automatic gain control (AGC) in the reception part (hereinafter referred to as "idle signal"). In this case, a signal sensor is used in the place of the carrier sensor 31 of FIG. 12. The output of the signal sensor is OFF when the idle signal is present on the path of transmission, whereas it is turned ON when effective data appear on the path of transmission. The FIFO 35 is a memory for the parallel input and parallel output. When the write pulse 34a is introduced from the write pulse generation circuit 34, the FIFO 35 allows the data of the parallel input to be written therein. At this time, a packet interval discrimination bit 33a (or 35a) such as the logical "1+ fed out of the packet interval detector 33 is written in the FIFO 35 at the same time.

Figure 14:
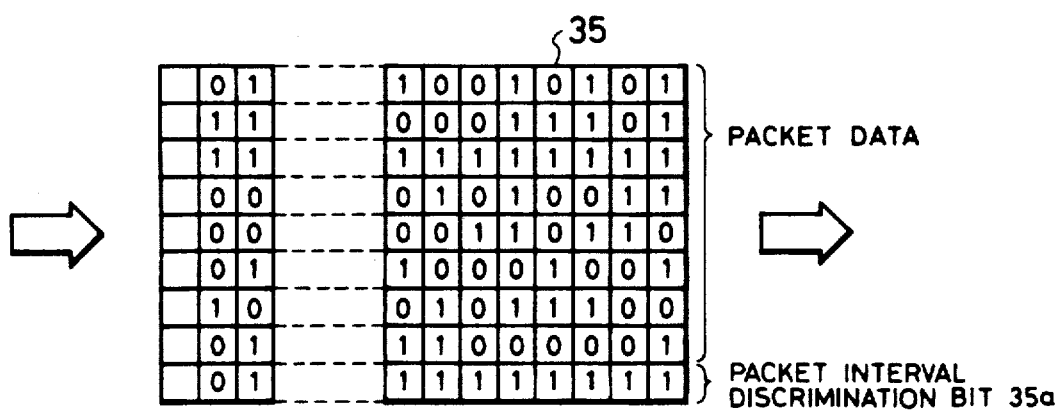
FIG. 14 is an artist's concept of data accumulated in FIFO of the A station unit of FIG. 12.

FIG. 14 is an artist's concept of the data stored in the FIFO 35. Where the FIFO 35 has the width of 9 bits, packet data are written in the first 8 bits and the packet interval discrimination bit 35a indicative of the boundary between the present packet and the next packet is written in the remaining one bit. In the illustrated case, "0" is used as the packet interval discrimination signal.

The packet interval detector 33, when the carrier detection signal 31a issued from the carrier sensor 31 assumes the OFF (time, $t_2$, in the diagram of FIG. 13) status, issues the packet interval discrimination signal of logical "0" during the injection of the last parallel signal input. This signal is written in together with the last parallel input signal by the write pulse 34a. Further, the write pulse generation circuit 34 is caused by the carrier detection signal 31a to feed out a pulse 34a for writing the parallel input signal and the packet interval discrimination bit in the FIFO 35. It discontinues operation when the carrier detection signal 31a assumes the OFF status.

Figure 15:
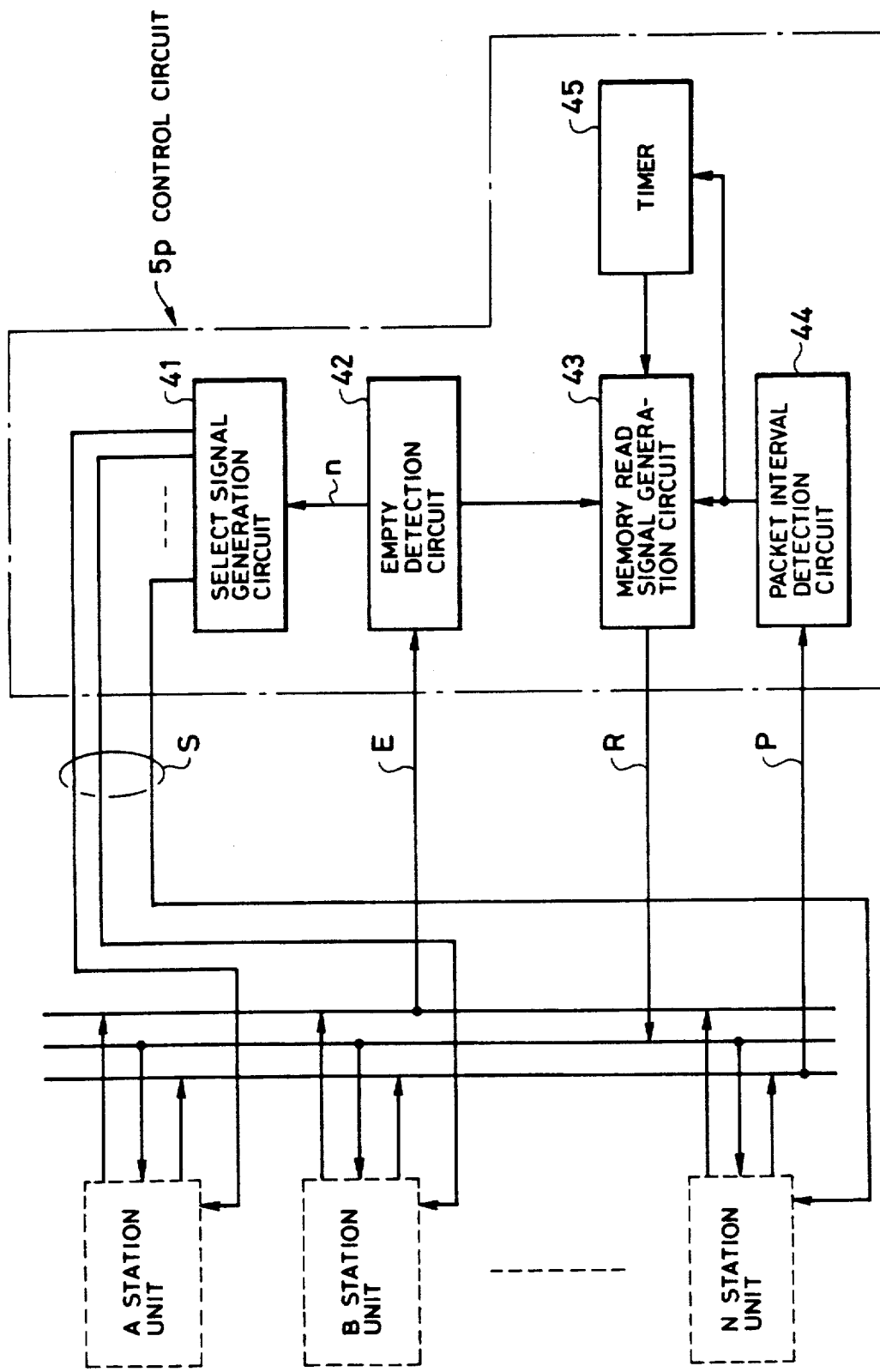
FIG. 15 is a block diagram illustrating a typical central station and peripheral connection lines in the system of FIG. 11.

Now, a typical example of the control circuit 5p in the arrangement of FIG. 11 will be described below with reference to the block diagram of FIG. 15. For facilitating the illustration, FIG. 15 additionally shows a connection diagram involving the control circuit 5p and the A, B, ..., N station units.

The control circuit 5p is composed of a select signal generation circuit 41, an empty detection circuit 42, a memory read signal generation circuit 43, a packet interval detection circuit 44, and a timer 45. These circuits 41, 42, 43, and 44 are electrically connected to the A, B, ..., N station units.

The select signal generation circuit 41 is adapted to select one of the station units through the medium of a select line S. The select signal generation circuit 41, each time a next signal n is received from the empty detection circuit 42, causes the select signal issued to the select line to be shifted to the next select line and, consequently, selects the next station unit. Each of the station units, on arrival therein of this signal, opens the gate 36 (see FIG. 12) and allows the signal line of the pertinent station to be connected to the control circuit 5p.

The signal brought in via the empty line E is detected by the empty detection circuit 42 and is then forwarded to the select signal generation circuit 41 and the memory signal generation circuit 43. At this time, when the received signal is in the ON status indicating that the relevant station unit has no packet data stored therein, the select signal generation circuit 41 mentioned above selects the next station unit and the memory read signal generation circuit 43 discontinues generation of a read signal. When the signal mentioned above is in the OFF status indicating that the relevant station unit has packet data stored therein, the select signal generation circuit 41 continues to retain the station unit of current selection and the memory read signal generation circuit 43 issues a read signal via the read line R. The memory read signal generation circuit 43, on introduction therein of the packet interval detection signal from the packet interval detection circuit 44, suspends the issuance of a read signal.

The packet interval detection circuit 44, on detecting the packet interval detection signal forwarded via the packet interval detection signal transmission line D from the station unit, transmits this signal to the memory read signal generation circuit 43 and the timer 45. The timer 45, on reception of the packet interval detection signal, is actuated to clock the prescribed time. This represents the smallest time to intervene between the adjacent packets. The memory read signal generation circuit 43 suspends the transmission of a read signal while the timer 45 is in operation and resumes the transmission when the operation of the timer 45 terminates.

Now, the operation of the present embodiment will be described. In the present embodiment, the amount of data which can be accumulated in the reception memories, i.e. the FIFO's, of A–N station units is fixed in advance as described above. It is managed independently by the terminal devices of A–N stations, for example.

It is now assumed that the largest value of the total amount of data which can be simultaneously accumulated in the reception memories of A–N station units is P (bits) and the speed of transmission in the system of the present embodiment is S (bits/second). Then, the maximum delay time, T (at the central station), which intervenes between the time a given station issues a packet and the time the central station issues the same packet is given by the following expression.

$$T = P/S \text{ (second)}$$

The maximum delay time, T, that suits the purpose of this invention can be obtained and consequently the maximum delay time of the system in transmission can be guaranteed for the system by setting P and S at suitable values.

The terminal devices within the system can each obtain a fixed rate of transmission by determining the maximum amount, P, of data accumulation, This allocated amount of data accumulation is variable with the characteristic qualities (such as picture image and voice data) of the terminals. The allocation of the amount of accumulation can be made fixedly at the rise time of the system or can be made dynamically.

It is only natural that the total of the amounts of accumulation allocated to the individual terminals should not surpass the maximum amount, P, of data to be accumulated in the entire system. The question on how the amount of data accumulation allocated to each of the terminal stations should be used is left entirely to the discretion of the station to be involved.

For example, P=1 (M bits) is obtained when the system's speed S of transmission is fixed at 100 (M bits/second) and the maximum delay time T in transmission at 10 (m seconds). It is assumed that a certain terminal station A is given an allocation of 2016 bits and the idle time between packets (the smallest packet interval counted by the timer in the arrangement of FIG. 15) is 48 bits. Then, the station A is allowed to establish a data channel of 196.8 Kbits/second using 1968+48 (bits). It can otherwise establish two channels, 128 Kbits/second and 64 Kbits/second, using (1280+48)+(640+48) (bits).

To guarantee variation in the allocation of the amounts of accumulation, it is desirable to give the reception memories of the station units such capacities as exceed the maximum possible amounts of accumulation (P).

In the conventional system, the terminal stations after issuance of packets assume the state prohibiting issuance of packets. In the system under consideration, however, the following alteration is contemplated. It is assumed that a certain terminal station is allowed to establish two channels, CH1 and CH2, which are each given a guaranteed maximum delay time in transmission. When this terminal station issues the packet of CH1 at the request of the upper layer, it assumes the state prohibiting the issuance of only the packet of CH1. When this terminal station is subsequently made to issue the packet of CH2 at the request of the upper layer, it assumes the state prohibiting transmission at all. When the packet of CH1 is returned, the terminal station is allowed to issue only the packet of CH1. When the packet of CH2 is also returned, then the terminal station is allowed to issue the packet of CH2 as well.

Incidentally, the control circuit 5p of the central station 5 continuously monitors the statuses of the reception memories in the station units by polling through the medium of the empty signal line E. The control circuit 5p, for example, issues a memory read signal to the reception memory of A station and causes the reception memory to feed data onto the data bus DB when the empty signal being brought in from the A station unit assumes the OFF status indicating that the reception memory of the A station is filled with data packets. The control circuit 5p continues to issue memory read signals at the same speed as that of the network, causing the data from the A station to appear on the data bus B. When the packet interval detection signal is introduced as placed at the trailing end of the packet data, the timer 45 is actuated to discontinue the reading out of the memory for the smallest packet interval (48 bits' length in the preceding case). When the empty signal mentioned above subsequently assumes the On status after the smallest packet interval, the next station unit is selected by the select signal. When the empty signal does not assume the On status, since the accumulation of data is still continuing, the reading of data from the memory is restarted. That is to say, the reading of the data of the next channel is restarted.

In accordance with the present embodiment, since the maximum amount of data to be accumulated simultaneously in the reception memories in the A-N station units of the central station is fixed as described above, the maximum delay time in transmission of packet data is exclusively fixed by the system's speed of transmission. Thus, the present embodiment realizes the real-time transmission of data such as voice data.

The foregoing typical system has been described as establishing one channel or two channels in one terminal station. This invention is not limited to this particular configuration. The number of channels to be established in a given terminal station can be freely selected within the limit of the amount of data accumulation allocated to the terminal station. This selection is left to the discretion of the terminal station of interest.

Now, the fourth embodiment of this invention which contemplates dynamically allocating the amount of data accumulation to the FIFO 35 mentioned above will be described below.

To the terminal devices, certain fixed amounts of accumulation are allocated at the rise time so that the total of the amounts, Q, will satisfy the relation $Q<P$ (bits). This means that the paths of transmission fixed for the system and vested with the guaranteed maximum delay in transmission has a remainder equalling the difference, $P-Q$ (bits).

Within the system is installed a terminal station whose function is to manage this amount of accumulation (hereinafter referred to as "accumulation control terminal"). If a given terminal station requires to transmit data in an amount exceeding the initially allocated amount, it sends a request packet for allocation of an extra amount of accumulation to the accumulation control terminal. In the data area of this request packet is written the amount of accumulation being sought.

The accumulation control terminal is possessed of a table showing the condition of use of the allocation of amount of accumulation. On receiving the request packet seeking allocation of an extra amount of accumulation, the accumulation control terminal checks this table and, when the amount of accumulation requested is in reserve, sends a permit packet for allocation of the amount of accumulation to the terminal device seeking the allocation and, at the same time, renews the contents of the table.

If the amount of accumulation requested is not in reserve, the accumulation control terminal sends a refusal packet to the terminal device. The terminal device which has requested the allocation of an extra amount of accumulation, on receiving the permit packet for the allocation, is allowed to expand the amount of accumulation guaranteed the maximum delay by the extra amount thus allocated.

As soon as the added amount of accumulation becomes no longer necessary, the terminal device sends a return packet for the allocated amount of accumulation to the accumulation control terminal. On receiving this return packet, the accumulation control terminal again renews the contents of the table.

Now, the embodiment of this invention which contemplates dynamically allocating the amount of accumulation to the FIFO 35 will be described more specifically below.

Figure 16:
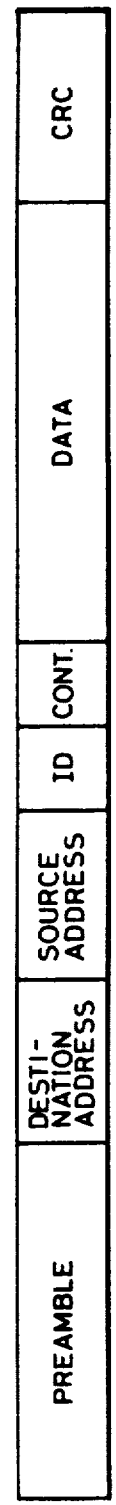
FIG. 16 is a diagram illustrating a typical packet format.

FIG. 16 illustrates a typical format of a packet to be fed in and out of the terminal devices of A-N stations. This packet is composed of a preamble, a destination address (addressee), a source address (addressor), an ID field, a content field, data, and CRC. The ID field serves, when a given terminal devices is transmitting data through a multiplicity of channels, to show data for discrimination of the channels. The content field shows the data for discriminating among (a) a general packet, (b) a packet for requesting allocation of the amount of accumulation, (c) a packet permitting the allocation of the amount of accumulation, (d) a packet refusing the allocation of the amount of accumulation, and (e) a packet returning the allocated amount of accumulation.

Figure 17:
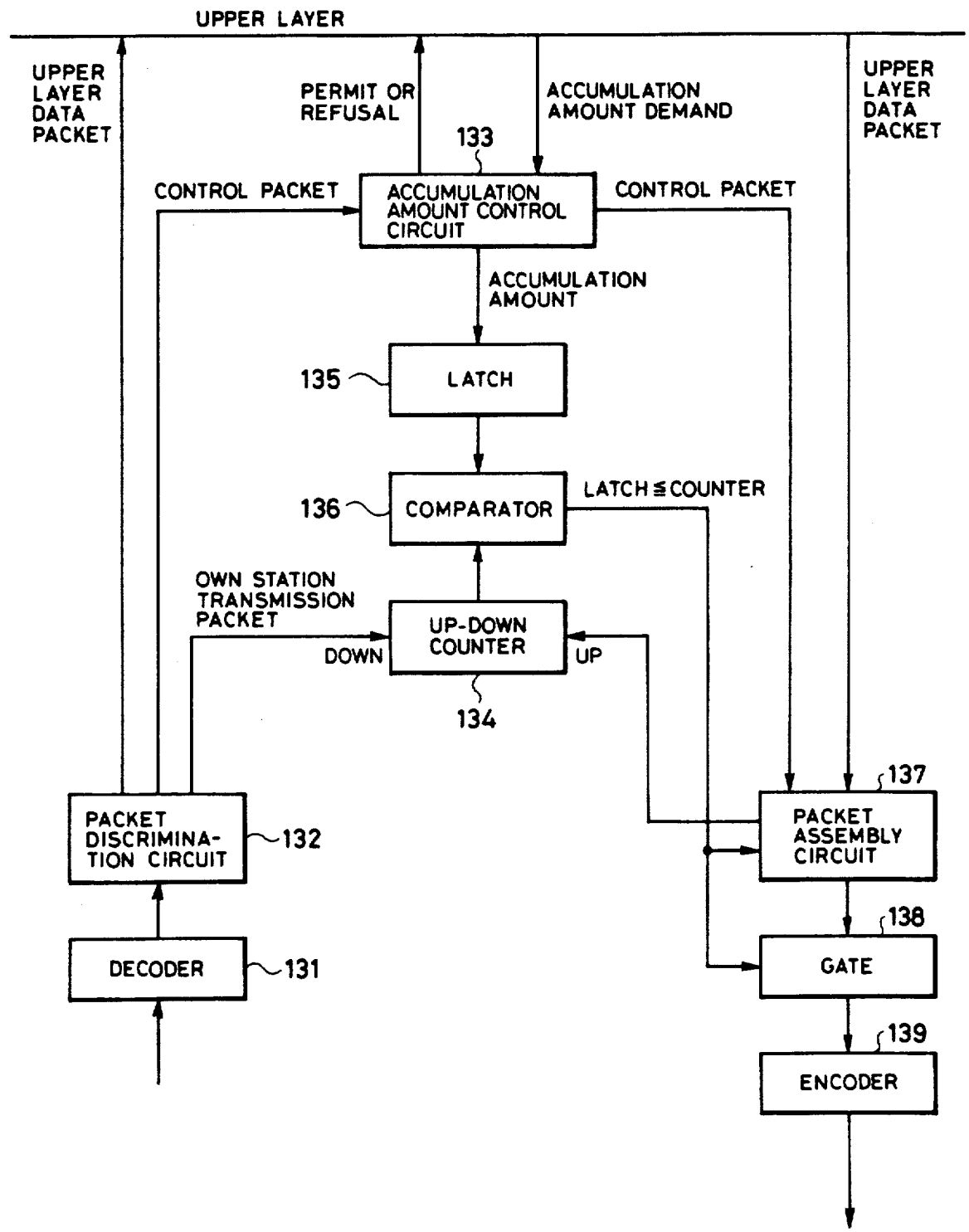
FIG. 17 is a block diagram illustrating a typical station terminal device to be used in the fourth embodiment of this invention.

FIG. 17 illustrates a typical configuration of the A-N station terminal devices mentioned above. A decoder 131 serves to decode packets brought in and a packet discrimination circuit 132 serves to interpret the overhead part of the decoded packet. The packet discrimination circuit 132, when the destination address turns out to be itself, operates as follows.

(1) When the content field has a general packet, it forwards the data field to the upper layer designated in the ID field.

(2) When the content field has a control packet regarding the allocation of the amount of accumulation, it forwards the data field to an accumulation amount control circuit 133 which will be described more fully afterward.

(3) When the source address turns out to be itself, it forwards a pulse of the packet length to an up-down counter 134 which will be described more fully afterward. For example, it issues one pulse to the up-down counter 134 each time one byte of data has been received.

The up-down counter 134 counts up a packet length each time it sends out a packet and counts down a packet length each time it receives a returned packet. Thus, the value indicated in the up-down counter 134 represents the number of packets which have been sent out and not yet returned.

A latch circuit 135 serves to memorize the amount of accumulation (such as the number of bytes) permitted at present to the own station, brought in from the accumulation amount control circuit 133. A comparator 136 serves to compare the output of the up-down counter 134 and that of the latch circuit 135. The feed control circuit disposed inside the upper layer is aware of the value of the amount of accumulation allocated to the own station and serves to prevent the amount of data fed out at once to the central station from exceeding the amount mentioned above. To be specific, the feed control circuit refuses a request for transmission of data when the amount requested exceeds the amount allocated. The amount of data accumulated at the central station always remains below a fixed level because the feed control circuit reads out a fixed amount of data once within one frame time from the permitted synchronous terminal and forwards it to a packet assembly circuit 137.

The packet assembly circuit 137 serves to assemble a packet of data in accordance with the data forwarded from the upper layer or at the request from the accumulation amount control circuit 133. It, however, refrains from assembling the next packet and issuing an assembled packet temporarily when the output of the comparator 136 is active, namely when the value of the up-down counter 134 exceeds the amount of accumulation permitted at present to the own station as latched to the latch circuit 135. It also functions to forward a pulse equalling the packet length just fed out to the up-down counter 134. A gate 138 is controlled by the output of the comparator 136. By 139 is denoted an encoder.

Now, a typical example of the accumulation control terminal will be described below with reference to FIG. 18. In the diagram, 141 stands for a decoder, 142 for a packet discrimination circuit, 143 for a table showing the condition of use of the allocation of the amount of accumulation, 144 for an accumulation amount control circuit, 145 for a latch circuit, 146 for an up-down counter, and 147 for a comparator. And, 148 stands for a packet assembly circuit, 149 for a gate, and 150 for an encoder. The other circuits than the table 143 and the accumulation amount control circuit 144 are those circuits which are required by the control terminal mentioned above in transmitting and receiving packets as in the arrangement of FIG. 17.

Figure 19:
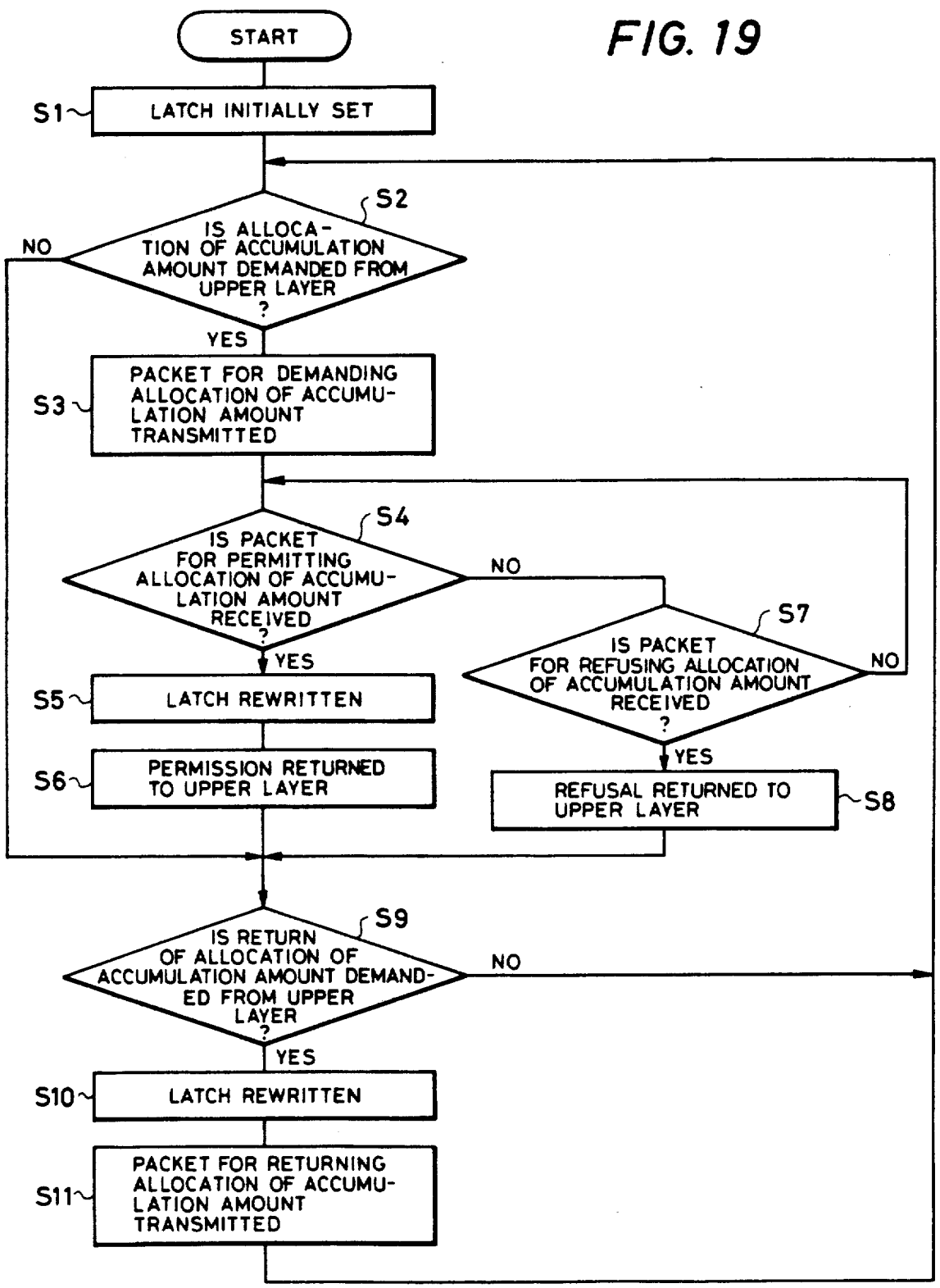
FIG. 19 is a flow chart illustrating the function of a transmission control circuit in the device of FIG. 17.

Now, the function of the accumulation amount control circuit 133 shown in FIG. 17 will be described below with reference to the flow chart of FIG. 19.

When the terminal device is actuated by a power source connection, the amount of accumulation set in advance in the terminal device is initially set in the latch circuit 135 (step S1). Subsequently, a decision is made as to whether or not a request for allocation of an amount of accumulation has been made by the upper layer (step S2). When the answer is in the affirmative, the processing advances to the next step S3, forwarding a control packet, i.e. a packet requesting allocation of an amount of accumulation, to the accumulation control terminal. Then a decision is made as to whether or not a permit packet for the allocation of an amount of accumulation has been forwarded as a control packet from the accumulation control terminal (step S4). When the answer is in the affirmative, the amount of accumulation in the latch circuit 135 is renewed (step S5) and acknowledgement of the receipt of the permit packet is made to the upper layer (step S6). On the other hand, when the answer is in the negative, a decision is made as to whether or not a refusal packet for the allocation of an amount of accumulation has been received (step S7). When the reception of this packet is confirmed, acknowledgement of the receipt of the refusal packet is made to the upper layer (step S8).

When the answer in the step S2 is in the negative and the responses in the steps S6 and S8 are completed, a decision is made as to whether or not a request for return of the allocation of the amount of accumulation has been made by the upper layer (step S9). When the answer is in the negative, the processing is returned to the step S2. On the other hand, when the answer is in the affirmative, the amount of accumulation in the latch circuit 135 is renewed (step S10). Subsequently, a return packet for the allocation of the amount of accumulation is forwarded to the accumulation control terminal mentioned above (step S11).

In the manner described above, the latch circuit 135, on receiving a request for allocation of an amount of accumulation from the upper layer, obtains a permit from the accumulation control terminal and renews the amount of accumulation accordingly. On the other hand, when it is requested to return the amount of accumulation allocated by the upper layer, it renews the amount of accumulation in itself and, at the same time, notifies the accumulation control terminal of the renewal and effects a proper change in the contents of the table of the accumulation control terminal.

Figure 20:
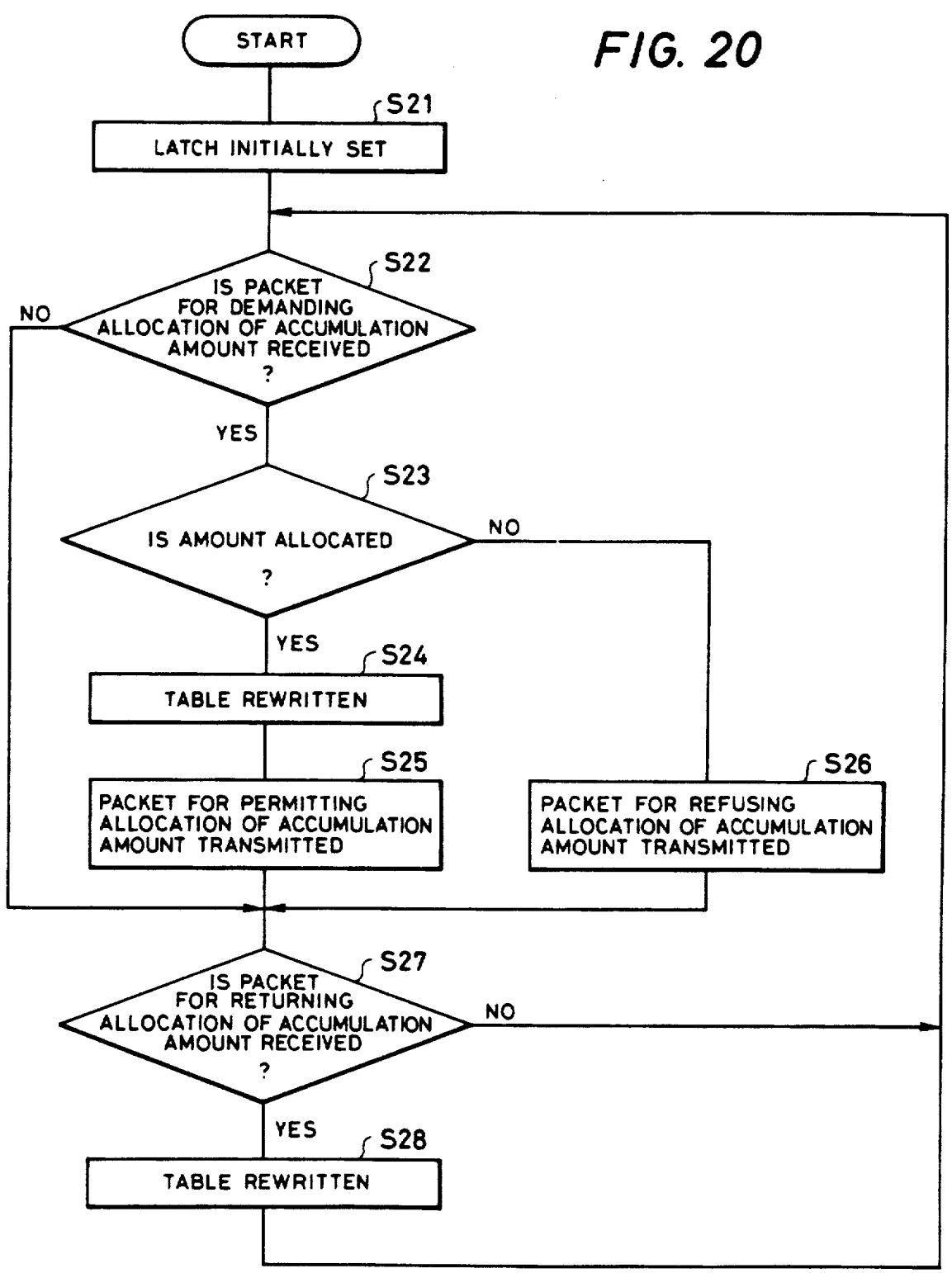
FIG. 20 is a flow chart illustrating the function of a transmission control circuit in the device of FIG. 18.

Now, the function of the accumulation amount control circuit 144 of the accumulation control terminal will be described below with reference to the flow chart of FIG. 20.

First, the amount of accumulation allocated to the terminal device is latched to the latch circuit 145 (step S21). Then, a decision is made as to whether or not a request packet for the allocation of the amount of accumulation has been received (step S22). The accumulation amount control circuit 144, on receiving the request packet for allocation of the amount of accumulation, makes a decision as to whether or not there exists any remainder of the amount of accumulation allocated (step S23). When there exists a remainder, the accumulation amount control circuit 144 effects a proper change in the contents of the table 143 (step S24) and, at the same time, issues a permit packet for allocation of the amount of accumulation (step S25). On the other hand, when the answer in the step S23 is in the negative, the feed control terminal issues a refusal packet for the allocation of the amount of accumulation (step S26).

Subsequently, a decision is made as to whether or not a return packet for the allocation of the amount of accumulation has been received (step S27). When the answer is in the negative, the processing is returned to the step S22. On the other hand, when the answer is in the affirmative, the contents of the table 143 are renewed accordingly (step S28). Subsequently, the processing is returned to the step S22.

As described above, when the accumulation control terminal receives a request packet for allocation of the amount of accumulation, it consults the table and finds whether or not there exists any remainder of the amount of accumulation allocated. When the remainder exists, the accumulation control terminal sends a permit packet for allocation of the amount of accumulation to the terminal device which has made the request. On the other hand, when no remainder exists, it issues a refusal packet for allocation. On receiving a request for return of the allocation, it effects a proper change in the contents of the table.

The fourth embodiment of this invention, as described above, permits the amounts of data simultaneously accumulated by the terminal devices of A–N stations in the respective reception memories of A–N stations to be dynamically varied within the limit of the maximum value, P, thus guaranteeing the maximum delaY of the whole system in transmission and ensuring more efficient utilization of the system.

Now, a system for effecting synchronous communication with the third and fourth embodiments of this invention mentioned above will be described below.

Generally, when transmission of data is effected by means of a coaxial cable or an optical fiber, a clock component is superimposed on the data by the coding technique when the data are put to transmission. The Manchester code and the CMI code have been known as useful in the coding technique. The stellate store and broadcast network has the use of the coding as a prerequisite for its operation.

In the conventional stellate store and broadcast network, the transmitter 5r shown in FIG. 11, on appearance of data on the data bus DB, takes in the data on the data bus B, encodes them by the coding technique mentioned above, and broadcasts the encoded data to all the terminals. When all the data are thus removed from the data bus DB, the transmitter 5r discontinues the transmission of data to all the terminal devices, leaving the paths of transmission in an idle state. Owing to the idle state mentioned above, the terminal devices are each enabled to discern the boundary between two adjacent packets.

The synchronous communication can be easily accomplished by the individual stations being adapted to effect transmission and reception of data on one and the same clock. In the stellate network, it is preferable in due consideration of the topology thereof to adopt the system which realizes the synchronous communication by the central station being adapted to effect constant supply of a clock to all the terminal devices. To accomplish this system, the function of the transmitter 5r and the mode of transmission are required to be altered as follows.

The transmitter 5r, on appearance of data on the data bus DB, takes in the data from the data bus DB, encodes the data by the coding technique mentioned above, and broadcasts the encoded data to all the terminal devices. Then, the transmitter 5r repeats this procedure until all the data are taken out of the data bus DB. When transmission of the data on the data bus DB is completed, the transmitter 5r issues a synchronization pattern. The synchronization pattern is desired to be such that the individual symbols used therein will enable easy locking of the reception PLL of the terminal device. In the case of the Manchester coding, this pattern is 010101010101 . . . . The boundary between the entrailing data bit and the synchronization pattern can be made discernible by means of a bit violation, i.e. by effecting a conversion of symbol not conforming with the conventional rules of symbol conversion.

Figure 21:
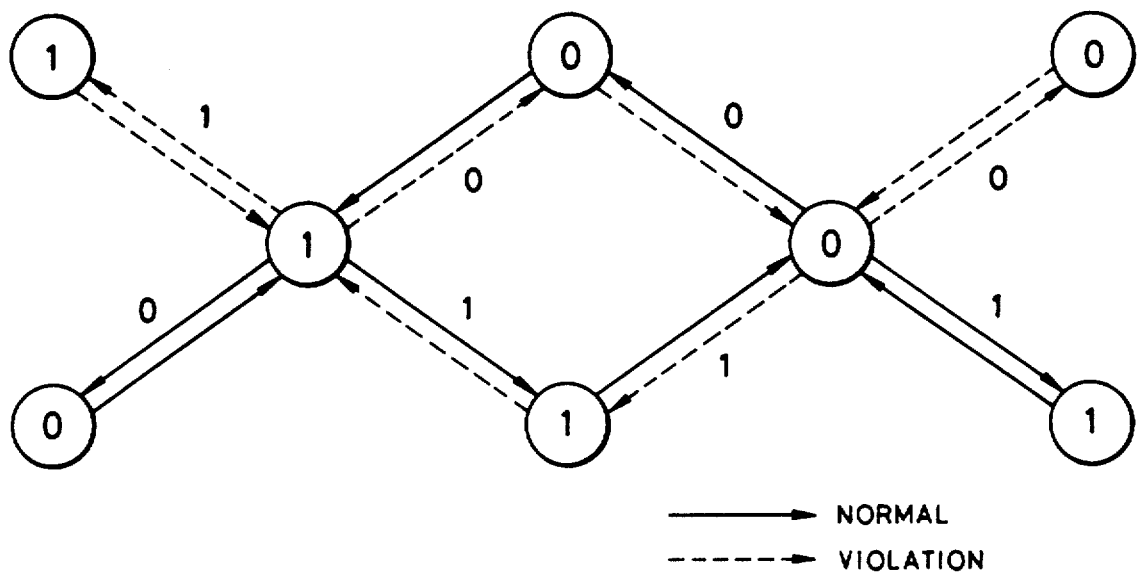
FIG. 21 is a diagram illustrating the Manchester change of code statuses.

In the diagram of change of status shown in FIG. 21, the solid line shows the ordinary rules of Manchester symbol conversion and the broken line the rules of Manchester symbol for bit violation.

Then, the boundary between the synchronization pattern and the next packet is recognized by a pattern different from the synchronization pattern. When a pattern of . . . 1010101011 is adopted, for example, the bits following this pattern can be recognized as forming a next packet. The technique of the kind just described is well known to the art. It may adopt other symbols than those mentioned above.

Alternatively, the recognition of the boundary between the last data bit and the synchronization pattern may be attained by incorporating in the relevant packet a "LENGTH" field. With a redundant symbol such as 4B5B, for example, the boundary with the synchronization pattern may be made discernible in the form of an end delimiter or start delimiter. By the introduction of this known coding technique to the stellate store and broadcast network, the constant supply of a common clock from the central station to the terminal devices of stations can be attained.

When the common clock is supplied from the central station to the terminal devices of the stations as described above, the clock reaching the terminal station never entails the phenomenon of slip. When packets are fed cyclically by means of the clock, the stellate network under discussion realizes the synchronous communication because the maximum delay in transmission is guaranteed therefor.

The operation indicated above will be described below with reference to FIG. 22. The circuits enclosed with a dotted line represent the terminal device of the stellate storage for the connection of synchronization terminals, as a typical example of the terminal devices of A-N stations shown in FIG. 11. The central station continues to supply a clock as superimposed on a certain encoded signal. It is PLL 151 that extracts the clock component from the encoded signal. By means of the clock thus extracted, the decoder 152 decodes the signal mentioned above and the packet discrimination circuit 153 makes a decision as to whether or not the packet has been addressed to the own station. This circuit also makes a decision as to whether or not the packet has been issued by the own station.

The packet discrimination circuit 153, on finding that the received packet is addressed to the own station, admits this packet and forwards it to the FIFO for the synchronization terminal. At this time, the writing of data in the FIFO is effected by means of a clock produced by dividing the received clock extracted by the PLL 151. In the case of a synchronization terminal of 64 Kbps, for example, the clock on the LAN is divided into quotients of 64 Kbps, the divided clocks are fed to the synchronization terminals, and the reading and writing of data in the FIFO is carried out as synchronized with the divided clocks. By dividing the clock on the LAN and feeding the divided clocks to the synchronization terminals, the synchronization terminals which are conducting communication through the medium of the LAN are allowed to receive clocks of entirely the same speed and effect transmission and reception of data without entailing any slip of the clocks. When the packet discrimination circuit 153 mentioned above finds that the received packet is issued from the own station, it sends a pulse to the up-down counter 134 and subtracts 1 from the value of count each time the reception has been made to a prescribed length.

A frame counter 154 generates a frame timing for effecting the transmission of a packet in accordance with the received clock extracted by the PLL 151. The feed control circuit 155 finds the remainder of the fixed value of allocation in a register 157 and, by the frame timing fed from the frame counter 154, issues a signal urging transmission of packets within the limit of the value of the remainder once per frame to the synchronization terminals which have advanced requests for transmission. As the result, the synchronization terminals which have made the requests for transmission are allowed to feed out data to the packet assembly circuit 156, without suffering the departing packets to collide against each other.

The packet assembly circuit 156 is controlled by the output of the comparator 136. The comparator 136 issues a permit signal to the packet assembly circuit 156 when the value in the up-down counter 134 is smaller than or equal to the fixed allocated value held in storage in a register 157. The packet assembly circuit 156, on receiving this permit signal, assembles data in packets and forwards the produced data packets through the gate to an encoder 158. The encoder 158, with the reception clock extracted by the PLL 151, encodes the packeted data and forwards the outcome of the encoding via the transmission and reception lines to the central station. At this time, the packet assembly circuit 156 sends a signal to the up-down counter 134 each time the transmitted data reaches a fixed length (1 byte, for example) to increase the value of count in the counter 134 by 1.

When the transmission of packets from the synchronization terminals abnormally increases and the value in the up-down counter 134 exceeds the fixed allocated value mentioned above, the comparator 136 issues a prohibition signal to the packet assembly circuit 156 and the gate and, as a result, the issuance of packets from the synchronization terminals is prohibited. Thus, the maximum delay in transmission is guaranteed for the system as a whole.

In the stellate store and broadcast network, the paths of synchronous transmission possessed of guaranteed maximum delay in transmission can be realized in the manner described above. The conventional asynchronous communication is attained by issuing packets with a local clock which is not synchronous with the supplied clock. Naturally, it is permissible for these two forms of communication to coexist in the network.

Figure 23:
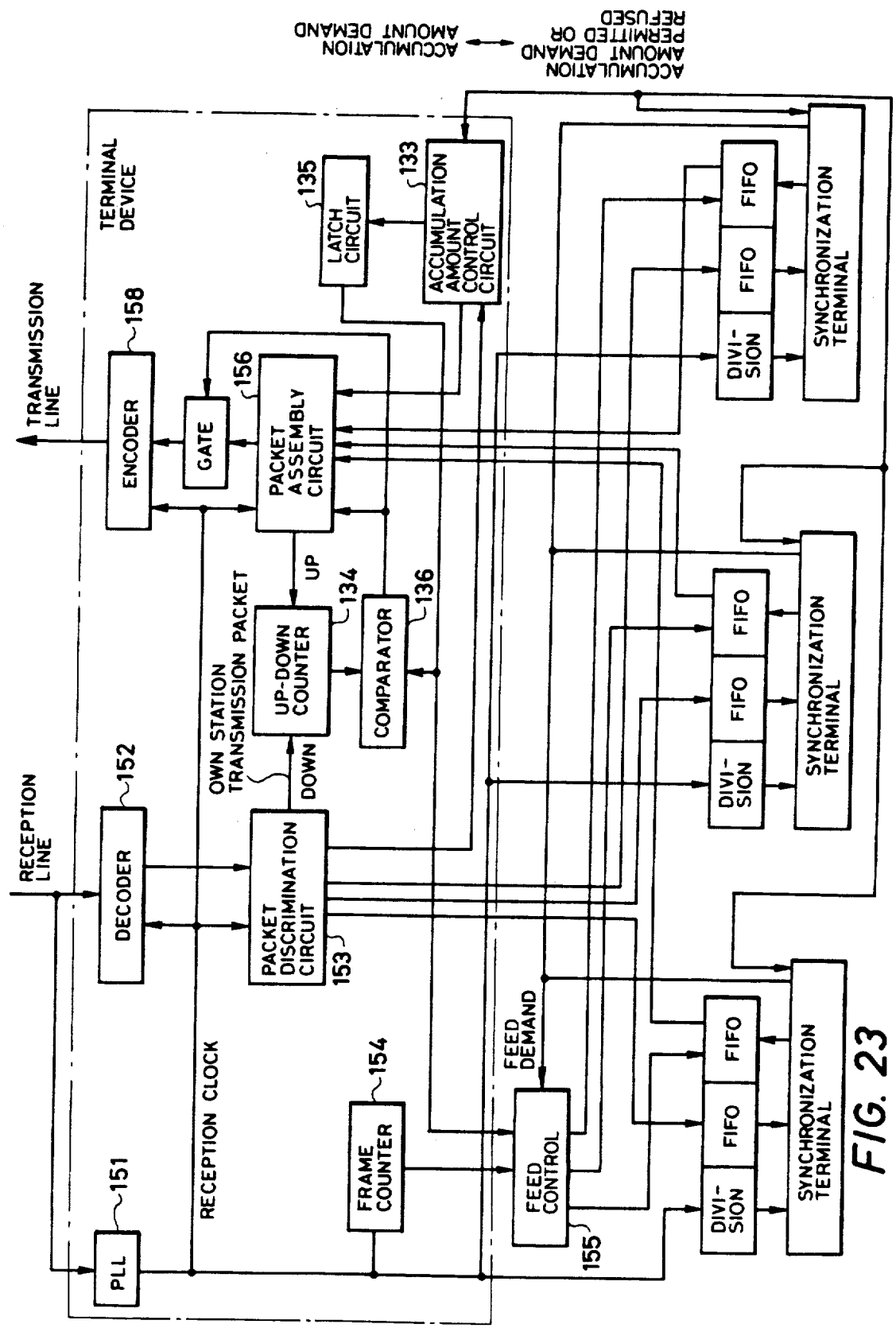
FIG. 23 is a block diagram illustrating a typical dynamic synchronous communication terminal device.

A typical terminal device suitable for use in a system designed to allocate dynamically the amount of accumulation is shown in FIG. 23. The configuration of FIG. 23 differs from that of FIG. 22 only in respect that a latch circuit 135 and an accumulation amount control circuit 133 are incorporated in the place of the fixed allocation value register 157. In all the other respects, the two configurations are substantially identical.

Figure 18:
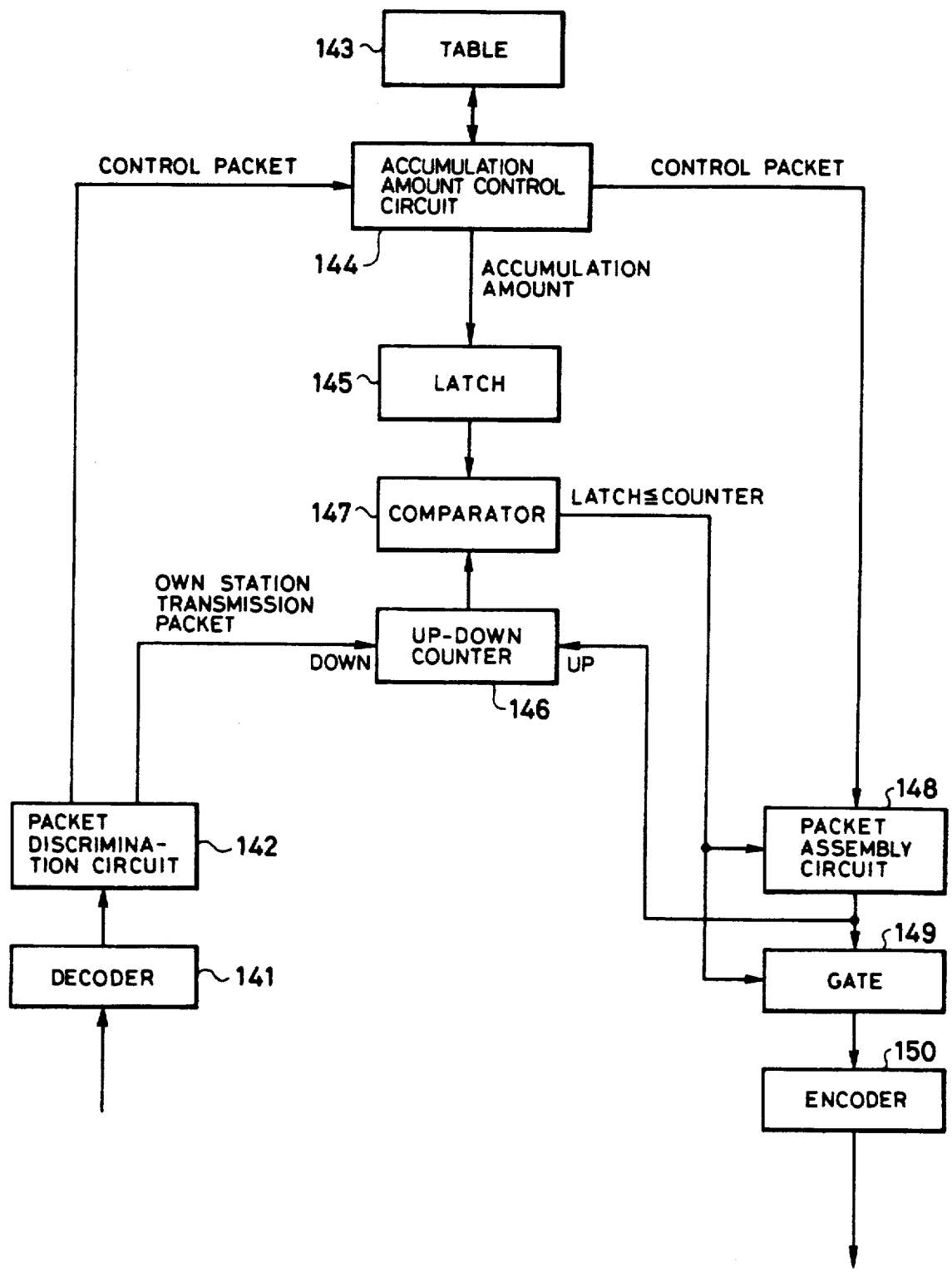
FIG. 18 is a block diagram illustrating a typical accumulation volume control terminal for the fourth embodiment.

The accumulation amount control circuit 133, on receiving a request for allocation of the amount of accumulation from the synchronization terminal, issues an allocation to the accumulation control terminal not shown (FIG. 18). On the other hand, when a signal permitting or refusing the request for allocation of the amount of accumulation is received from the accumulation control terminal, the accumulation amount control circuit 133 increases the value in the latch circuit 135 and, at the same time, notifies the synchronization terminal of the increase of the value when the signal is for permission. Since the accumulation amount control circuit 133 has the same function as the countertype in the configuration of FIG. 17, the details of the function are already clear and need not be repeated here.

Evidently, use of the terminal device of FIG. 23 permits establishment of a synchronous communication system allowed the maximum delay in transmission and involving dynamic allocation of the amount of accumulation.

Now, another system for effecting synchronous communication will be described below.

This system may be summarized as follows. The system as a whole is to be conceived as a frame. This frame is defined as a time frame of a fixed cycle. The central station keeps counting the frame length with a basic clock and broadcasts a packet dubbed as "frame timing packet" to all the terminal stations. The terminal devices each discern this packet and reproduce a frame timing from the timing of the packet.

In this manner, all the stations are allowed to possess one and the same frame timing and consequently guarantee the maximum delay in transmission and realize synchronous communication.

Now, this system will be described in detail below.

Figure 24:
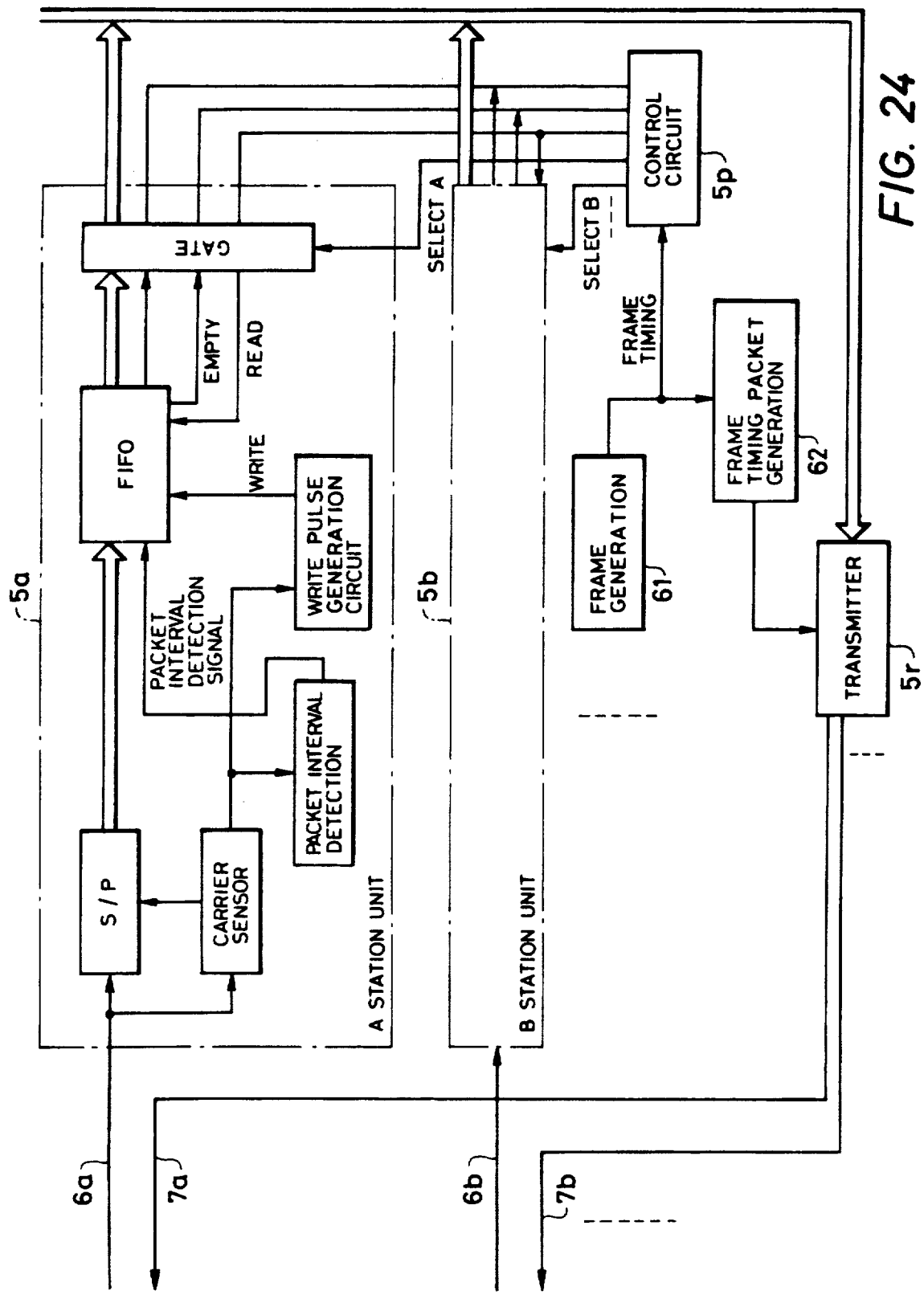
FIG. 24 is a block diagram of a synchronous communication central station.

FIG. 24 is a block diagram of the central station. The central station is additionally furnished with a frame generation circuit 61 and a frame timing packet generation circuit 62. The frame generation circuit 61 gives birth to a frame timing for common use by the terminal devices and issues a frame timing signal. The frame timing packet generation circuit 62, on receiving the frame timing signal, gives rise to a frame timing packet and broadcasts the packet through the medium of the transmitter 5r to all the terminal devices.

Figure 25:
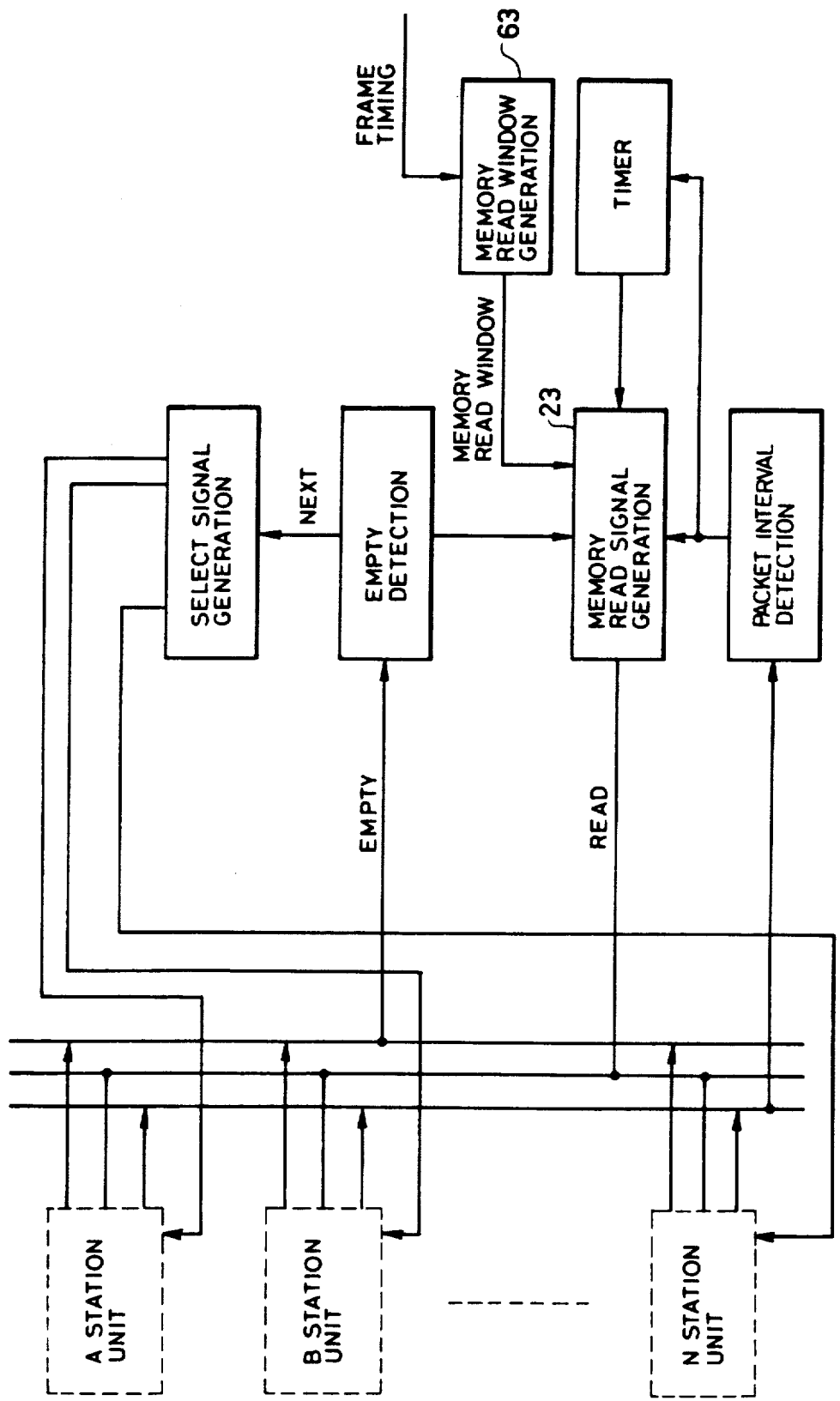
FIG. 25 is a block diagram illustrating a typical control circuit in the central station of FIG. 24.

During the transmission of the frame timing packet, the control circuit 5p controls this frame timing packet so as to prevent it from colliding against the other packets. A typical example of the control device 5p is shown in FIG. 25. This control circuit 5p differs from that of FIG. 15 only in respect that it additionally incorporates therein a memory read window generation circuit 63.

Figure 26:
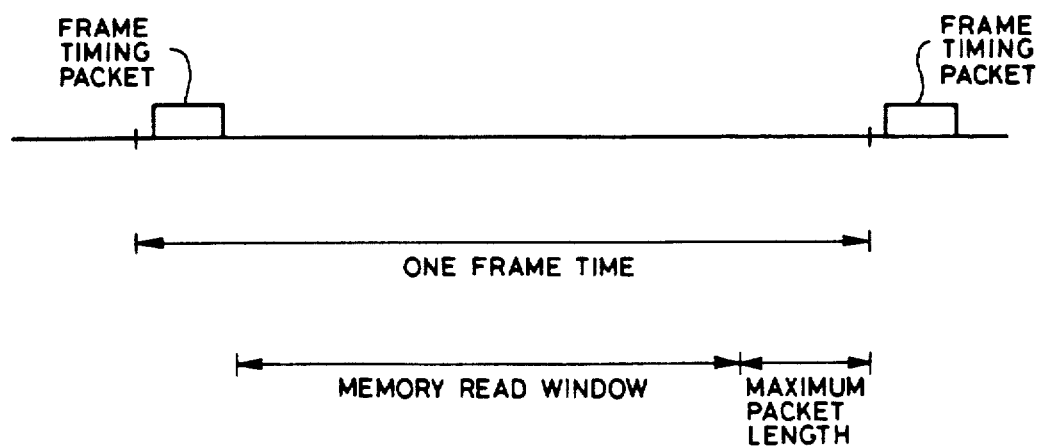
FIG. 26 is an explanatory diagram of the operation of a memory read window.

The memory read window generation circuit 63, in accordance with the frame timing signal, gives rise to a frame timing and, based on the largest packet length and the smallest packet interval, produces a memory read window as illustrated in FIG. 26. During the interval of this memory read window, the memory read signal generation circuit 23 remains active and is capable of preventing collision with the frame timing packet.

Now, the configuration of another typical system 15 designed to synchronize the terminal devices of A-N stations of FIG. 11 and the processing effected by the system will be described below with reference to FIG. 27. The frame timing packet forwarded from the central station is decoded by a decoder 171, discerned by a packet discrimination circuit 172, and forwarded to a frame counter 173. The frame counter 173 detects the frame timing and feeds a reset signal to a clock generator 174. Since the clock generator 174 is self-driven with the local clock and is reset by the frame timing, it supplies a clock synchronized with the frame timing to the synchronization terminals. The synchronization terminals read and write data in the FIFO as synchronized with the clock.

The feed control circuit 155 finds the remainder of the fixed allocated amount in the register 157 and issues a signal urging transmission of a packet within the limit of the remainder to the synchronization terminals which have advanced requests for transmission once per frame.

The rest of the operation is the same as that which has been described with reference to FIG. 22 and, therefore, requires no explanation. Evidently, use of this embodiment realizes establishment in the stellate store and broadcast network those paths of synchronous transmission endowed with guaranteed maximum delay in transmission. Alternatively, the conventional asynchronous communication is established by issuing packets with a local clock not synchronous with the supplied clock. Naturally, these two forms of communication can coexist in one and the same stellate store and broadcast network.

Adaptation of the synchronous communication terminal devices of FIG. 27 to the system involving dynamic allocation of the amount of accumulation, similarly to those of FIG. 23, is attained by using a latch circuit and a feed control circuit in the place of the fixed allocation amount register 157 thereby enabling the feed control circuit to keep the accumulation control terminals informed of changing amount of accumulation and permitting control of the amount of packets sent to the transmission lines.

As is plain from the explanation given above, the third and fourth embodiments of this invention attain the following effects.

(1) They are practicable as in voice transmission and FA because they guarantee the maximum delay time, T, in transmission of packeted data.

(2) They permit construction of systems of high versatility because each of the terminal devices is allowed to establish a channel for which any maximum delay time in transmission is guaranteed within the limit of the allocated amount of accumulation of data.

(3) They permit the amounts of accumulation of data to be dynamically allocated to the terminals, depending on the conditions of their service in the system.

(4) They do not discriminate the systems by the presence or absence of synchronism of communication.

(5) They retain all the characteristic qualities of the stellate store and broadcast network as the first embodiment, precluding the possibility of collision of data packets, ensuring satisfactory physical efficiency of transmission, and obviating the necessity for setting the largest system length.

Now, the fifth embodiment of the present invention will be described below.

In the stellate network, incorporation of local concentrator devices in the system is frequently contemplated. The term "local concentrator" means a device which is interposed between the central station and terminal stations for the purpose of dividing one set of transmission and reception lines from the central station into a multiplicity of transmission and reception lines. To the corresponding terminal stations, therefore, the local concentrator appears as though it were a central station. To the central station, it appears as though it were a terminal station. In other words, the terminal station side I/F's of the local concentrator are equivalent to the terminal station side I/F's of the central station, while the central station side I/F's of the local concentrator are equivalent to the I/F's of the terminal stations toward the central station.

In the case of the first embodiment, there arises the following difference between the presence and the absence of such local concentrators. Now, a ten-story building is assumed which has 100 datagram terminal stations installed on each of the floors and a central station installed on the ground floor. When no local concentrator is used, the cables from all the 1,000 terminal stations are connected to the central station on the ground floor. If a terminal station is added on a certain elevated floor, then an additional cable must be laid from the central station on the ground floor to the newly installed terminal station.

When local concentrators are installed one each on the floors, the terminal stations on each of the floors are connected to a local concentrator on the same floor and the local concentrators on the different floors are connected to the central station. In this arrangement, the cables used at all have only to be enough to connect the central station to 10 terminals. Even when a terminal station is added on a certain floor, it suffices to lay a cable between the local concentrator on that floor and the newly added terminal station. What has been described similarly applies where ten one-story buildings are distributed on one premise.

Thus, incorporation of local concentrators in the stellate store and broadcast network is characterized by simplifying wire distribution and facilitating addition of terminal stations.

Now, the effectiveness of local concentrators in the third and fourth embodiments mentioned above will be described below.

In the case of the stellate store and broadcast network for which the maximum delay in transmission is guaranteed as in the third and fourth embodiments described above, the amount of data packets to be accumulated simultaneously within the central station is limited to ensure that the maximum delay in transmission of packets issued from the terminal stations is below a fixed length of time. As the result of this arrangement, the time required for all the reception memories of the central station to finish broadcasting data packets is within a fixed length of time even when the packets from the stations are concentrated at a point of time. The data packets which are issued from the terminal stations to the central station, therefore, are broadcast completely within the fixed length of time. The time for this broadcasting constitutes the maximum delay in transmission for the system.

In the system of this nature, there exist terminals for which the maximum delay in transmission need not be guaranteed. When the maximum delay in transmission is assumed to be 10 m.sec, since the speed of voice transmission is 64 Kbps (64 kilobits per second), the terminal stations which handle voices are each required to send out 80 bytes plus overhead packets, i.e. about 100 bytes of packets, within the span of 10 m.sec. For the terminal stations provided with one voice channel, therefore, the reception memories at the terminal interfaces of the central station require 100 bytes. In the case of Ethernet (a data communication network made by Xerox Corporation), for example, the largest packet length is 1,500 bytes. In fact, in the intercomputer communication of this sort, the packet length of this order is an imperative necessity. For the datagram terminal stations which issue such packets as described above, the reception memories at the terminal station interfaces of the central station require 1,500 bytes.

Incidentally, in the stellate store and broadcast network for which the maximum delay in transmission is guaranteed, a total of 125 voice terminal stations can be connected to the network on the assumption that the speed of transmission for the system is 10 Mbps. In contrast, in the Ethernet system, it is only 8 datagram terminal stations that can be connected at all. This is because the same maximum delay in transmission as allowed for the voice terminal stations is guaranteed for the datagram terminal stations. The characteristic qualities of the datagram terminal stations are as follows.

(a) The terminal stations permit transfer of data without requiring establishment of connection.

(b) They have an extremely small duty factor.

(c) They have a high probability of issuance of packets of the smallest length and packets of the largest length.

(d) They are not required to guarantee the maximum delay in transmission.

Thus, these datagram terminal stations need not be treated on a par with the voice terminal stations, for example.

With due respect to these characteristic qualities of the datagram terminal stations, the fifth embodiment provides a stellate store and broadcast network capable of simplifying wire distribution as compared with the first, third, and fourth embodiments mentioned above and, at the same time, permitting connection of far more datagram terminal stations.

Figure 28:
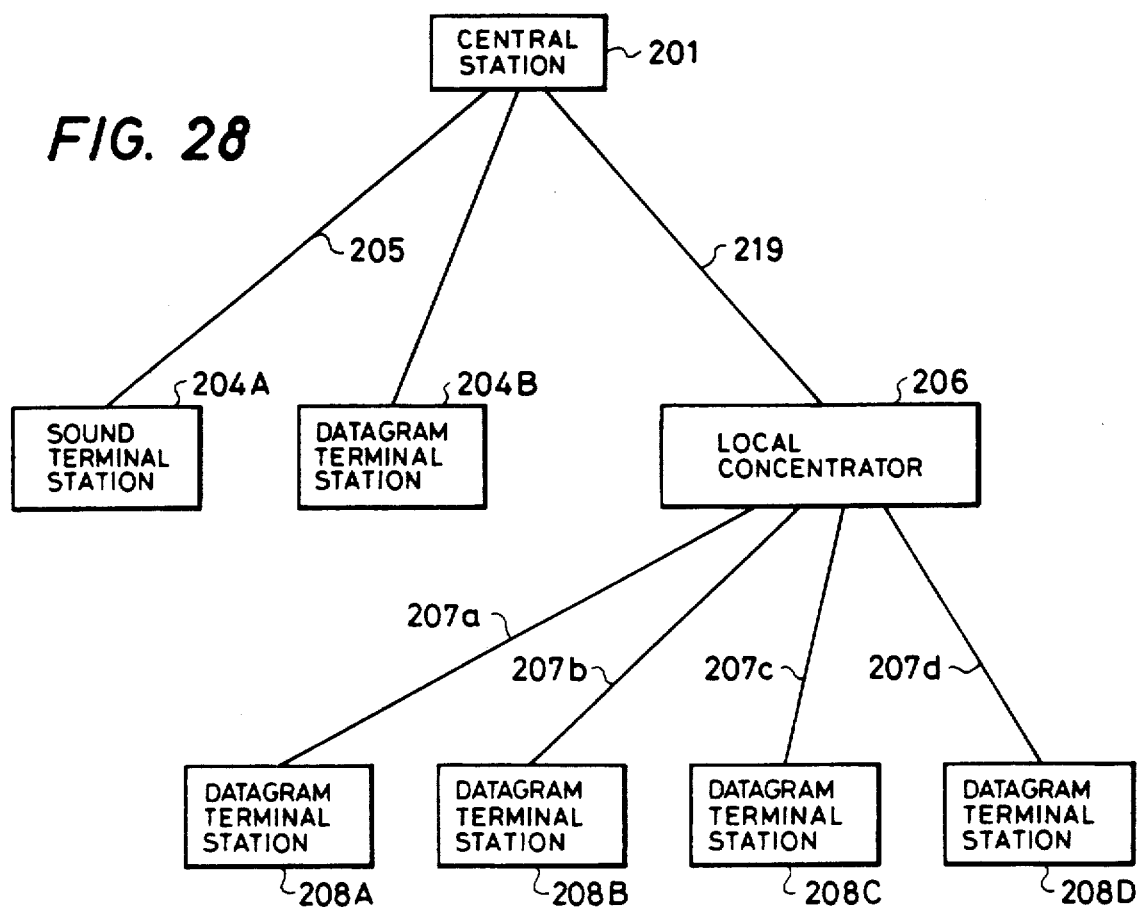
FIG. 28 is a system diagram of the fifth embodiment of this invention.

Now, the construction and operation of the fifth embodiment will be described in detail below with reference to FIG. 28. As illustrated in the diagram, sound terminal stations 204A and datagram terminal station 204B are connected directly to the terminal interfaces of a central station 201 through the medium of transmission and reception lines 205. When the maximum delay in transmission is guaranteed, the number of stations which can be connected becomes fairly small as described above because the number of terminal stations available for connection is limited and particularly because the datagram terminals have a large packet length and occupy a large proportion of the amount of accumulation allowed for the central station. For the solution of this problem, a local concentrator device 206 is connected to one of the terminal interfaces of the central station 201 through the medium of a transmission-reception line 219 and a plurality of datagram terminal stations 208A-208D for which the maximum delay in transmission need not be guaranteed are connected to the local concentrator device 206 through the medium of transmission-reception lines 207a-207d as illustrated in the diagram.

Figure 29:
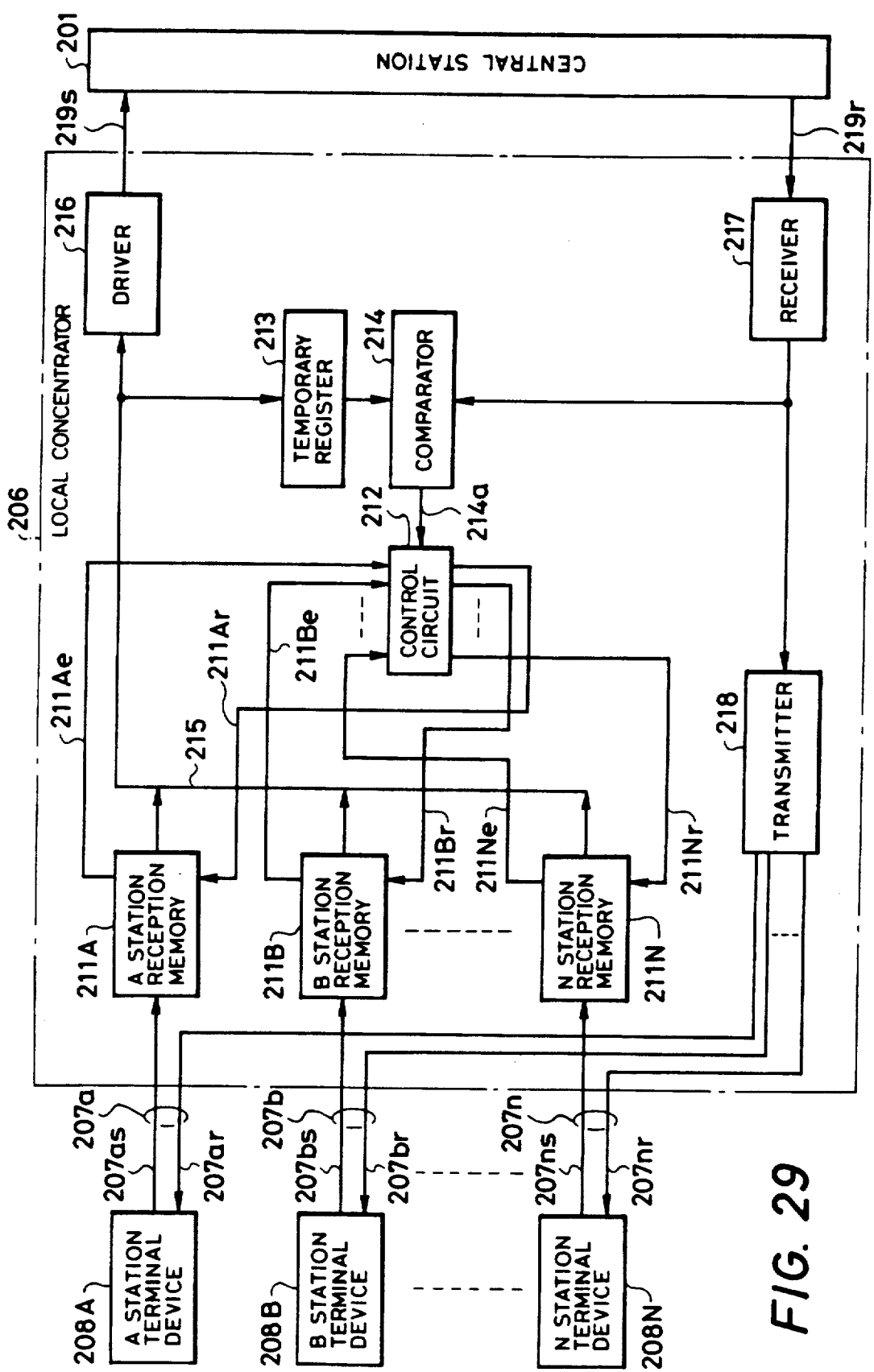
FIG. 29 is a block diagram of a typical local concentrator in the system of FIG. 28.

The block diagram of a typical example of the local concentrator device 206 is illustrated in FIG. 29.

This local concentrator device 206 is composed of reception memories 211A-211N, a control circuit 212, a temporary register 213, a comparator 216, a receiver 217, and a transmitter 218.

The terminal stations 208A-208N are connected respectively to the reception memories 211A-211N through the medium of transmission lines 207as-207ns and reception lines 207ar-207nr. A driver 216 is connected to the terminal interface of the central station 201 through the medium of a transmission line 219s. The central station 201 and the receiver 217 are interconnected with a reception line 219r so that the signals emanating from the central station will be injected into the receiver 217 via the reception line 219r.

The driver 216 constitutes itself data transmission means for forwarding data read out of the reception memories 211A-211N to the central station and the receiver 217 constitutes itself data reception means for advancing data received from the central station 201 to the terminal stations. The temporary register 213 constitutes itself a storage circuit for temporarily storing data read out of the reception memories 211A-211N and the comparator 214 constitutes itself a comparison circuit for comparing the temporarily stored data with the data issued from the central station 201.

The data transmitted from the terminal stations 208A-208N are passed through the transmission lines 207as-207an into the reception memories 211A-211N inside the local concentrator device 206. The reception memories 211A-211N are each possessed of a capacity for the largest length of a packet and are adapted so that even when all the terminal stations 208A-208N issue packets all at once, none of the emanating packets will collide against each other. Further, the reception memories 211A-211N possess the function of causing their respective empty signals 211Ae-211Ne to assume the ON status when they are empty of data or causing the same signals to assume the OFF status when they are filled with data and forwarding the empty signals of either of the statuses to the control circuit 212.

Besides, the reception memories 211A-211N possess the function of receiving memory read signals 211Ar-211Nr from the control circuit 212 and, whenever this reception is made, sequentiallY issuing the data of input packets head on onto a data bus 215 and, on completion of this issuance, causing the empty signals 211Ae-211Ne to assume the ON status. The data which appear on the data bus 215 are forwarded from the driver 216 through the transmission line 219s to the central station 201. Part or the whole of the data which appears on the data bus 215 is stored in the temporary register 213. The packets broadcast from the central station 201 advance through the reception line 219r into the receiver 217 and are thence forwarded to the comparator 214 and the transmitter 218.

In the comparator 214, part or the whole of the data is compared with the content of the temporary register 213. The comparator 214 sends an agreement signal 214a to the control circuit 212 when they agree to each other. This operation is intended to find whether or not the packets forwarded by the local concentrator devices 206 to the central station 201 are wholly returned again to the local concentrator devices 206 when the central station 201 broadcasts them. Specifically, the comparison of data in the comparator resides in determining whether or not the packets are those of own issuance. It is, therefore, necessary at least to make this comparison with respect to regions of source addresses of the packets.

In the meantime, the data which have been forwarded by the receiver 217 to the transmitter 218 are broadcast to the reception lines 207ar-207nr of the respective terminal stations 208A-208N.

Figure 30:
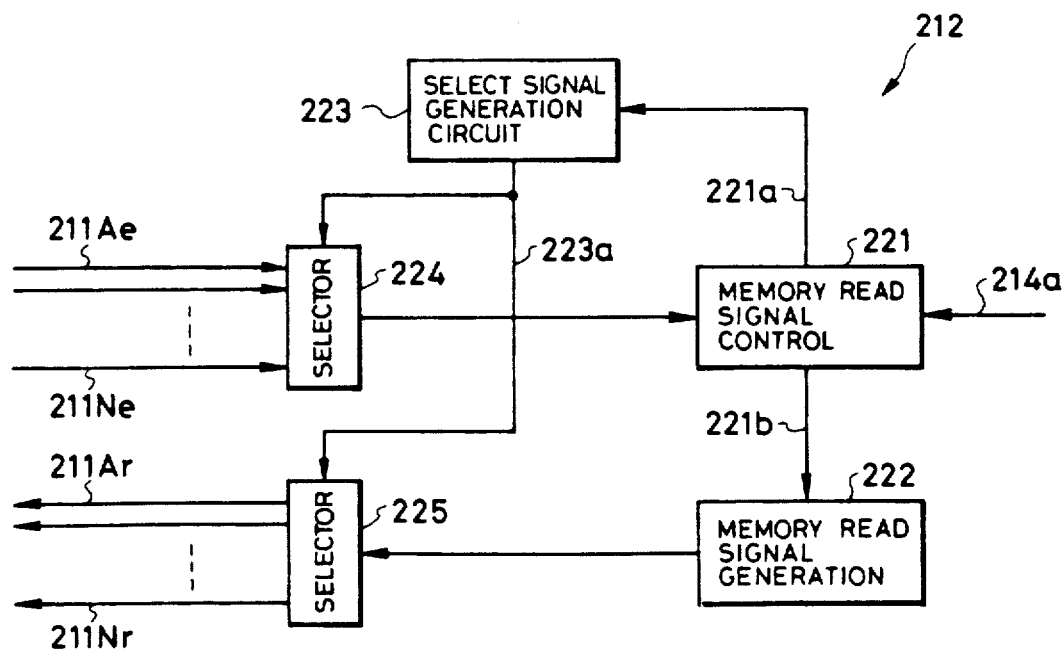
FIG. 30 is a block diagram of a typical control circuit in the local concentrator.

A typical construction of the control circuit 212 is illustrated in FIG. 30.

This control circuit is composed of a memory read signal control circuit 221, a memory read signal generation circuit 222, a select signal generation circuit 223, and two selectors 224 and 225. This control circuit 212, by continuously polling the reception memories 211A-211N (FIG. 29), monitors the conditions of the reception memories 211A -211N by admitting the respective empty signals 211Ae-211Ne. It is the select signal generation circuit 223 that controls this polling. The select signal generation circuit 223 feeds a select signal 223a to the selectors 224 and 225 so as to select either the empty signals 211Ae-211Ne fed in from the respective reception memories 211A-211N (FIG. 29) or the memory read signals 211Ar-211Nr fed out to the respective reception memories and, on arrival of the next signal 221a, switches the selection for selection of the next reception memories.

The memory read signal control circuit 221 monitors the empty signal fed in from the selector 224 and, when the empty signal is on the ON status, concludes that the relevant reception memory is empty of packet, forwards the next signal 221a to the select signal generation circuit 223, and checks the next reception memory. The memory read signal control circuit 221 repeats this procedure and, on detection of an empty signal in the OFF status indicating that the relevant reception memory is filled with packets, issues an enable signal 221b to the memory read signal generation circuit 222. The memory read signal generation circuit 222, on receiving the enable signal 221b, issues a memory read signal toward the selector 225 at a speed equalling the speed of transmission through the paths of transmission. This memory read signal is forwarded to the particular reception memory which has been selected by the selector 225.

As the result of this operation, the data in any of the reception memories 211A-211N shown in FIG. 29 are caused to appear on the data bus 215, then forwarded to the central station 201, and at the same time, stored in the temporary register 213. When the data are wholly removed from the reception memories 211A-211N, the empty signals 211Ae-211Ne are caused to assume the ON status. The memory read signal control circuit 221 (FIG. 30) causes the enable signal 221b to assume the OFF status. The memory read signal generation circuit 222, on receiving this enable signal 221b, discontinues issuance of a memory read signal.

Now, with reference to FIG. 29, when the packets forwarded to the central station 201 are broadcast and then returned again to the local concentrator device 206, the comparator 214 issues an agreement signal 14a. As illustrated in FIG. 30, the memory read signal control circuit 221, on receiving the agreement signal 14a, issues a next signal 221a and checks the next reception memory.

In the manner described above, the data fed out by the terminal stations 208A-208N are multiplexed by the local concentrator device 206 and sent out to the central station 201. The data fed out by the central station 201 are broadcast to all the terminal devices connected to the central station. As the result of this operation, the local concentrator devices 206 are treated substantially on a par with the other terminal stations 204A and 204B (FIG. 28). Thus, the central station 201 is enabled to effect the broadcasting of data packets without any regard to the presence of datagram terminal stations connected to the local concentrator devices 206. Besides, the datagram terminal stations which are connected to the local concentrator devices 206 in accordance with the third and fourth embodiments are enabled to transmit and receive data with the delay time depending on the number of connections.

Naturally, the stellate store and broadcast network of the present embodiment is not limited to the construction described above.

Optionally, two or more local concentrator devices may be connected to this stellate network and a plurality of datagram terminal stations may be connected to each of the local concentrator devices.

The fifth embodiment described above brings about the following effects.

(1) This embodiment enhances the freedom in increasing the terminal stations because the terminal devices for which the maximum delay in transmission need not be guaranteed can be connected to the network through the medium of local concentrator devices.

(2) In the case of a stellate network incorporating a multiplicity of datagram terminal stations, use of two or more local concentrator devices permits simplification of wire connection between the central station and the datagram terminal stations.

What is claimed is:

1. A stellate store and broadcast network with collision avoidance comprising a plurality of terminal devices, a central station for collectively receiving data packets transmitted from said terminal devices and selectively broadcasting said data packets to said terminal devices, and a plurality of bidirectional communication channels interconnecting said terminal devices and a plurality of terminal interfaces in said central station, which station comprises a plurality of reception memories interconnected to said terminal interfaces of said central station with each reception memory having a capacity for storing therein at least one data packet transmitted thereto from a said terminal device over a said bidirectional communication channel through a said terminal interface, a control circuit for monitoring whether data packets are stored in said reception memories and for providing read signals sequentially to selected ones of those of said reception memories containing stored data packets to cause them to provide at outputs thereof data packets representing those data packets stored therein, and a broadcasting means interconnected to said terminal interfaces and to said reception memory outputs for broadcasting data packets provided by said reception memories to all the terminal devices over the bidirectional communication channels.

2. The stellate store and broadcast network with collision avoidance of claim 1, wherein a correspondence is established between each of said plurality of said terminal devices and one of said reception memories through said terminal device being interconnected through one of said bidirectional communication channels to one of said terminal interfaces to which that said reception memory with which it is to correspond is also interconnected, and wherein said terminal devices are capable of selectively transmitting data packets to a corresponding one of said memories of said central station at any desired time except when that said reception memory is storing a data packet therein.

3. The stellate store and broadcast network with collision avoidance of claim 1, wherein said reception memories are capable of providing to said control circuit storage status signals indicating whether or not they are storing data packets therein.

4. The stellate store and broadcast network with collision avoidance of claim 1, wherein said control circuit, in monitoring said reception memories to determine whether data packets are stored therein, does so by polling idicators from each.

5. The stellate store and broadcast network with collision avoidance of claim 1, wherein said control circuit is provided with a polling means capable of polling storage status signal lines extending thereto from said reception memories once within each of a series of fixed duration time frames (each hereinafter referred to as one "frame") to obtain storage status information from each, and a discrimination memory means connected to said polling means for storing discrimination data from said polling means as to which of said reception memories are storing data packets therein based on the storage status information obtained by said polling means, and with said broadcasting means being capable of sequentially receiving data packets provided by those of said reception memories corresponding to said discrimination data stored in said discrimination memory means, through said control circuit providing said read signals formed by used of said discrimination data, and broadcasting those data and packets so received to said terminal devices.

6. The stellate store and broadcast network with collision avoidance of claim 5, wherein said frame is timed by a frame counter.

7. The stellate store and broadcast network with collision avoidance of claim 5, wherein said control circuit is capable of causing said discrimination memory means therein to provide said discrimination data in an order which can vary in each frame as a basis for generating said read signals.

8. The stellate store and broadcast network with collision avoidance of claim 5, wherein said control circuit is capable of causing said discrimination memory means therein to provide said discrimination data in an order fixed in each said frame as a basis for generating said read signals.

9. The stellate store and broadcast network with collision avoidance of claim 5, wherein said control circuit is capable of causing said memory discrimination means therein to provide said discrimination data in two portions in each frame as a basis for generating said read signals, one portion in an order fixed for that portion in each frame and the other portion in an order which can vary for that portion in each frame.

10. The stellate store and broadcast network with collision avoidance of claim 5, wherein said control circuit provides said read signals for reading data packets from designated reception memories such that they are read at a rate equally a rate of transmission of said network, and further includes means for generating a signal for clearing those of said reception memories which have data packets therein in a frame without having provided them at outputs thereof within that frame.

11. A stellate store and broadcast network with collision avoidance comprising a plurality of terminal devices and local concentrator devices, a central station for collectively receiving data packets transmitted from selected ones of said plurality of terminal devices and said local concentrator devices, and selectively broadcasting representations of said data packets to both said terminal devices and said local concentrator devices, and a plurality of bidirectional communication channels interconnecting said selected ones of said plurality of terminal devices and said local concentrator devices with said central station, said central station having therein central reception memories for storing temporarily therein data packets transmitted thereto over said bidirectional communication channels from said selected ones of said plurality of terminal devices and local concentrator devices with said central reception memories being capable of providing representations of said data packets for selective broadcast to both said terminal devices and said local concentrator devices, said local concentrator devices each being connected between said central station and selected ones of said plurality of terminal devices which are chosen to be operated without a maximum delay time being assured for said data packets transmitted by those selected said terminal devices between such a transmission and a broadcast of data packets based thereon by said central station; said local concentrator devices each being provided with (a) concentrator terminal interfaces for said connection to said selected ones of said plurality of terminal devices, (b) a plurality of concentrator reception memories each capable of storing therein at least one data packet, (c) a concentrator control circuit for monitoring whether data packets are stored in said concentrator reception memories and for providing memory read signals sequentially to those of said concentrator reception memories holding therein stored data packets transmitted thereto by said selected ones of said terminal devices which memory read signals cause said concentrator reception memories to provide at outputs thereof data packets representing those stored therein, (d) a concentrator data transmission means for receiving the data packets provided at the outputs of said reception memories sequentially and transmitting them to said central station over said bidirectional communication channels, (e) a concentrator data reception means for receiving all the data packets broadcast thereto over said bidirectional communication channels from said central station and broadcasting representations thereof to said selected ones of said terminal stations, (f) a concentrator accumulation circuit for temporarily storing therein at least part of the data packets provided at the outputs of said concentrator reception memories, and (g) a concentrator comparison circuit capable of comparing said data packets stored temporarily in said concentrator accumulation circuit with those data packets received from said central station by said concentrator data reception means and, if the data packets so compared are found to match one another, issues an agreement signal to said concentrator control circuit to permit it to provide the next memory read signal in sequence to a said concentrator reception memory.

12. A stellate store and broadcast network with collision avoidance comprising a plurality of terminal devices and local concentrator devices, a central station for collectively receiving data packets transmitted from selected ones of said plurality of terminal devices and said local concentrator devices, and selectively broadcasting representations of said data packets to both said terminal devices and said local concentrator devices, and a plurality of bidirectional communication channels interconnecting said selected ones of said plurality of terminal devices and said local concentrator devices with said central station, said central station having therein central reception memories for storing temporarily therein data packets transmitted thereto over said bidirectional communication channels from said selected ones of said plurality of terminal devices and local concentrator devices with said central reception memories being capable of providing representations of said data packets for selective broadcast to both said terminal devices and said local concentrator devices, said local concentrator devices each being connected between said central station and selected ones of said plurality of terminal devices which are chosen to be operated without a maximum delay time being assured for said data packets transmitted by those selected said terminal devices between such a transmission and a broadcast of data packets based thereon by said central station; said local concentrator devices each being provided with (a) concentrator terminal interfaces for said connection to said selected ones of said plurality of terminal devices, (b) a plurality of concentrator reception memories each capable of storing therein at least one data packet, (c) a concentrator control circuit for monitoring whether data packets are stored in said concentrator reception memories and for providing memory read signals sequentially to those of said concentrator reception memories holding therein stored data packets transmitted thereto by said selected ones of said terminal devices which memory read signals cause said concentrator reception memories to provide at outputs thereof data packets representing those stored therein, said concentrator control circuit sequentially providing said memory read signals through issuing a said memory read signal to one of said concentrator reception memories, discontinuing said issuance of said memory read signal after a representative data packet appears at the output thereof, and thereafter, on reception of a signal from said concentrator comparison circuit indicating a match between data packets compared thereby, issuing the next memory read signal in sequence, (d) a concentrator data transmission means for receiving the data packets provided at the outputs of said reception memories sequentially and transmitting them to said central station over said bidirectional communication channels, (e) a concentrator data reception means for receiving all the data packets broadcast thereto over said bidirectional communication channels from said central station and broadcasting representations thereof to said selected ones of said terminal stations, (f) a concentrator accumulation circuit for temporarily storing therein at least part of the data packets provided at the outputs of said concentrator reception memories, and (g) a concentrator comparison circuit for comparing said data packets stored temporarily in said concentrator accumulation circuit with those data packets received from the central station by said concentrator data reception means.

* * * * *